US011168218B2

(12) United States Patent
Sötemann et al.

(10) Patent No.: US 11,168,218 B2
(45) Date of Patent: Nov. 9, 2021

(54) PROCESS FOR MANUFACTURING WHITE PIGMENT CONTAINING PRODUCTS

(71) Applicant: OMYA INTERNATIONAL AG, Oftringen (CH)

(72) Inventors: Jörg Sötemann, Rheinfelden (DE); Jörg Andreas Maier, Landskron (AT)

(73) Assignee: OMYA INTERNATIONAL AG, Oftringen (CH)

( * ) Notice: Subject to any disclaimer, the term of this patent is extended or adjusted under 35 U.S.C. 154(b) by 340 days.

(21) Appl. No.: 15/999,446

(22) PCT Filed: Feb. 13, 2017

(86) PCT No.: PCT/EP2017/053182
§ 371 (c)(1),
(2) Date: Aug. 16, 2018

(87) PCT Pub. No.: WO2017/140630
PCT Pub. Date: Aug. 24, 2017

(65) Prior Publication Data
US 2019/0233652 A1  Aug. 1, 2019

Related U.S. Application Data

(60) Provisional application No. 62/298,485, filed on Feb. 23, 2016.

(30) Foreign Application Priority Data

Feb. 16, 2016 (EP) ..................... 16156003

(51) Int. Cl.
| B03D 1/01 | (2006.01) |
| B03D 1/02 | (2006.01) |
| C09C 1/02 | (2006.01) |
| C09C 1/40 | (2006.01) |
| C09C 1/42 | (2006.01) |
| D21H 17/00 | (2006.01) |
| D21H 19/40 | (2006.01) |
| D21H 19/38 | (2006.01) |
| D21H 17/67 | (2006.01) |
| D21H 17/68 | (2006.01) |
| D21H 21/28 | (2006.01) |
| B03D 1/08 | (2006.01) |
| C09C 1/36 | (2006.01) |

(52) U.S. Cl.
CPC .............. C09C 1/021 (2013.01); B03D 1/011 (2013.01); B03D 1/028 (2013.01); B03D 1/082 (2013.01); B03D 1/085 (2013.01); C09C 1/3607 (2013.01); C09C 1/402 (2013.01); C09C 1/407 (2013.01); C09C 1/42 (2013.01); D21H 17/00 (2013.01); D21H 17/675 (2013.01); D21H 17/68 (2013.01); D21H 19/38 (2013.01); D21H 19/385 (2013.01); D21H 19/40 (2013.01); D21H 21/28 (2013.01); B03D 2201/02 (2013.01); C01P 2004/60 (2013.01); C01P 2006/12 (2013.01); C01P 2006/60 (2013.01); C01P 2006/80 (2013.01)

(58) Field of Classification Search
CPC ........ B03D 1/011; B03D 1/028; B03D 1/082; B03D 1/085; B03D 2201/02; C09C 1/021; C09C 1/401; C09C 1/42; C09C 1/407; C09C 1/402; C09C 1/3607; D21H 17/00; D21H 19/40; D21H 19/385; D21H 17/675; D21H 17/68; D21H 21/28; D21H 19/38; C01P 2006/12; C01P 2006/60; C01P 2006/80
USPC .................................. 209/164, 170
See application file for complete search history.

(56) References Cited

U.S. PATENT DOCUMENTS

| 3,990,966 | A | 11/1976 | Stanley et al. |
| 4,606,916 | A | 8/1986 | Hofinger et al. |
| 4,995,965 | A | 2/1991 | Mehaffey et al. |
| 5,720,873 | A | 2/1998 | Klingberg et al. |
| 7,073,588 | B2 | 7/2006 | Cassidy et al. |
| 8,936,159 | B2 * | 1/2015 | Gorochovceva ....... B03D 1/016 209/166 |
| 9,027,757 | B2 | 5/2015 | Pedain et al. |
| 2005/0189113 | A1 | 9/2005 | Cassidy et al. |
| 2011/0203975 | A1 | 8/2011 | Pedain et al. |
| 2015/0290659 | A1 * | 10/2015 | De Lima ................ B03D 1/011 209/166 |

FOREIGN PATENT DOCUMENTS

| AU | 2167883 | 3/1984 |
| CA | 1187212 | 5/1985 |
| CN | 101337204 | 1/2009 |
| CN | 101816981 | 9/2010 |
| EP | 0 035 263 | 9/1981 |
| EP | 0291271 | 11/1988 |
| EP | 1 584 674 | 10/2005 |
| EP | 1 806 392 | 7/2007 |
| EP | 1 876 224 | 1/2008 |
| EP | 2 659 028 | 11/2013 |
| EP | 2 700 680 | 2/2014 |
| EP | 2700680 | 2/2014 |
| WO | 97/26995 | 7/1997 |
| WO | 00/62937 | 10/2000 |

(Continued)

OTHER PUBLICATIONS

International Search Report and Written Opinion dated Apr. 6, 2017 in corresponding International Patent Application No. PCT/EP2017/053182, filed Feb. 13, 2017, 10 pages.

Primary Examiner — Thomas M Lithgow
(74) Attorney, Agent, or Firm — Sheppard, Mullin, Richter & Hampton LLP

(57) ABSTRACT

A process is described for manufacturing white pigment containing products. The white pigment containing products are obtained from at least one white pigment and impurities containing material via froth flotation.

77 Claims, No Drawings

(56) References Cited

FOREIGN PATENT DOCUMENTS

| WO | 2007/122148 | 11/2007 |
|----|-------------|---------|
| WO | 2008/084391 | 7/2008 |
| WO | 2008/089906 | 7/2008 |
| WO | 2010/051895 | 5/2010 |
| WO | 2011/147855 | 12/2011 |
| WO | 2012/089649 | 7/2012 |
| WO | 2014/083197 | 6/2014 |

\* cited by examiner

PROCESS FOR MANUFACTURING WHITE PIGMENT CONTAINING PRODUCTS

CROSS-REFERENCE TO PRIOR APPLICATIONS

This application is a National Stage of PCT/EP2017/053182, filed Feb. 13, 2017, and designating the United States (published on Aug. 24, 2017, as WO 2017/140630 A1), which claims priority under 35 U.S.C. § 119 to European Patent Application No. 16156003.2, filed Feb. 16, 2016, and under 35 U.S.C. § 120 to Provisional Application No. 62/298,485, filed Feb. 23, 2016, each hereby expressly incorporated by reference in its entirety and each assigned to the assignee hereof.

The present invention relates to a process for manufacturing white pigment containing products and, more particularly, relates to the field of technologies implemented in order to separate white pigments and impurities by froth flotation for the manufacture of white pigment containing products.

Pigments are generally known as materials that change the colour of reflected or transmitted light as the result of wavelength-selective absorption. This physical process differs from fluorescence, phosphorescence, and other forms of luminescence, in which a material emits light. Pigments are used for colouring e.g. paint, ink, plastic, fabric, cosmetics, food and other materials. Most pigments used are dry colourants, usually ground into a fine powder.

White pigments take a special position in the field of pigments due to their industrial relevance. For example, in the paper industry in Europe more than 10 million tonnes per year of white pigments are used. White pigments are also used in paints and coatings. Especially when manufacturing dispersion paints, white pigments are the base colour in the tinting system.

Naturally occurring white pigments are usually obtained by mining. However, generally, such white pigments contain impurities which induce discolouration such as, for example, greyness or yellowness. Furthermore, these impurities may affect the properties of the white pigments and, thus, lead to significant disadvantages in their use. A high amount of impurities such as, for example, silicates within the white pigments might increase the abrasive properties. Therefore, the impurities and the white pigments have to be separated from one another to obtain a white pigment containing product that is not, or merely marginally, contaminated with impurities.

It is known in the prior art to separate impurities from white minerals by physico-chemical separation. The physico-chemical separation process involves firstly grounding the metamorphic or sedimentary rock and then subjecting the resulting white pigment and impurities containing material to conventional froth flotation in an aqueous environment. Conventional froth flotation is a highly versatile method known in the prior art for physico-chemical separating of particles based on differences in the ability of gas bubbles to adhere selectively to specific surfaces in an aqueous suspension containing the white pigment and impurities containing material. The white pigments with attached air bubbles are then carried to the surface and are removed, while the impurities that remain completely wetted stay in the liquid phase.

As set out above, the basis of conventional froth flotation is the difference in the wettability of the white pigments and the impurities. White pigments can either be naturally hydrophobic, but in general the hydrophobicity is induced by chemical treatments. Chemical treatments to render a surface hydrophobic are essentially methods for coating a particle surface with a layer of suitable compounds.

However, conventional flotation has a significant disadvantage: As mentioned before, chemical treatments as collector agents are used to render the surface of the white pigments hydrophobic to separate these particles by gas bubbling. These collector agents are adsorbed on the surface of the white pigments and, therefore, modify the properties of the pigments. However, this modification may be undesirable in the following use of the white pigments in paper, plastics, paint, coatings, concrete, cement, cosmetic, water treatment, food, pharma, ink and/or agriculture applications, wherein preferably the white pigment containing product is used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces. Furthermore, the direct flotation of the desired white pigments is disadvantageous due to quality and economical reasons.

Alternatively, one may consider to use reverse/indirect froth flotation to separate the white pigments and the impurities. In contrast to conventional flotation, in which the desirable white pigments are directly floated and collected from the produced froth, reverse (indirect) flotation aims to have the undesirable impurities preferentially floated and removed, leaving behind a suspension that has been concentrated in respect to the desirable white pigments. Also during reverse flotation collector agents are used that render the impurities hydrophobic.

Corresponding methods that use collector agents in reverse froth flotation are already known, one class of collector agents are esterquats.

U.S. Pat. No. 3,990,966 refers to a wet process for purifying calcite ore by grinding and forming a slurry of calcite ore, separating said impurities from the calcite slurry by flotation of the impurities therefrom in the presence of a flotation agent, classifying the resultant calcite slurry, settling the classified calcite in a thickener and drying the product. As flotation agent a cationic surfactant selected from the group consisting of (a) 1-hydroxyethyl-2-heptadecenyl glyoxalidine, (b) 1-hydroxyethyl-2-alkylimidazolines and (c) salt derivatives of said imidazoline, wherein the alkyl portion of the imidazoline is the alkyl portion of a fatty acid of such length that said surfactant is liquid as used.

CA 1 187 212 relates to a process for purifying a carbonate ore containing silicates by flotation, wherein the ore is subjected to grinding to a fineness sufficient to release the impurities. The collector is a cationic reactant selected from the group consisting of the following quaternary amines: a) dimethyl dialkyl with 8 to 16 carbon atoms in the alkyl radicals, said alkyl radicals being saturated or unsaturated aliphatic, normal or branched; b) dimethyl alkyl benzyl with 10 to 22 carbon atoms in the radical alkyl which is a normal aliphatic; c) bis-imidazoline containing 12 to 18 carbon atoms in the alkyl radicals which are normally saturated or unsaturated aliphatic; d) salts derived from quatemary amines a), b) and c).

WO 2008/084391 A1 refers to a process for purification of calcium carbonate-comprising minerals comprising at least one flotation step, characterized in that this step implements at least one quaternary imidazoline methosulphate compound as collector agent.

WO 2008/089906 A1 relates to a process for the flotation of non-sulphidic minerals or ores, in which crushed crude minerals or ores are mixed with water and a collector to form a suspension. Air is introduced into the suspension in the presence of a reagent system and a floated foam containing said non-sulphidic mineral or ores formed therein along with a flotation residue comprising the gangue, wherein the improvement comprises using as the collector polymeric esterquats, obtainable by reacting alkanolamines with a mixture of monocarboxylic acids and dicarboxylic acids and quaternising the resulting esters in known manner, optionally after alkoxylation.

WO 2011/147855 A2 refers to the use of a polymeric quaternary ester product as a collector in a froth flotation process, to a method for froth flotation utilizing the polymeric quaternary ester, to the polymeric quaternary ester as such, and to methods for the production of the polymeric quaternary ester.

WO2010/051895 A1 relates to the use of a composition of A) at least one quaternary ammonia compound comprising at least one organic radical bonded to the ammonia nitrogen atom and optionally comprising heteroatoms and having 1 to 36 carbon atoms, and B) at least one amine alkoxylate ester of formula (1) or a salt thereof, where A, B are, independently of each other, a C2- through C5-alkylene radical R1, a C8- through C24-alkyl radical or alkenyl radical R2, R3, R4 independent of each other, H, or a C8- through C24-acyl radical, with the stipulation that at least one of the radicals R2, R3 or R4 stands for a C8- through C24-acyl radical, and x, y, z, independently of each other, stand for a whole number from 0 through 50, with the stipulation that x+y+z is a whole number from 1 through 100, in quantities of 10 through 5,000 g/tonne of ore as a collector in silicate flotation.

EP 2 659 028 A1 relates to the use of a product obtainable by the reaction of a fatty acid, or mixture of acids, having the formula R1COOH (I); and a dicarboxylic acid or a derivative thereof having the formula (IIa) or (IIb) with an alkoxylated fatty amine having the formula (III) or a partial or wholly quaternised derivative thereof; optionally said reaction between the fatty acid, the dicarboxylic acid and the alkoxylated fatty amine is being followed by a further reaction step wherein part or all of the nitrogen atoms are quaternised by reaction with an alkylating agent R5X; as a corrosion inhibitor for metal surfaces.

U.S. Pat. No. 5,720,873 refers to a method of cleaning calcium carbonate containing silicate impurities, in which a froth-flotation process is performed in the presence of a specific cationic collector.

AU 2167883 A relates to froth flotation of sized coal effected in an aqueous medium containing a fuel oil collector and a conditioner comprising a product formed by condensing 1 mole of an alkanolamine (I) with ≥0.8 mol of a fatty acid or fatty acid ester, or an acid derivative of such a product.

WO 00/62937 A1 refers to a froth flotation process in which silicates are separated from an iron ore in the presence of a collector containing a specific quaternary ammonium compound. This collector has a high selectivity to concentrate silicates in the froth product, while a high yield of iron minerals is maintained in the bottom concentrate or concentrates.

WO 97/26995 A1 relates to the use of so-called quaternary esters as an aid for flotation of non-sulfidic minerals.

U.S. Pat. No. 4,995,965 refers to a process for purifying calcium carbonate ore by the removal of silicate impurities from the ore by reverse flotation. The process achieves high yields and low acid insoluble content of the calcium carbonate product by employing specific collectors.

CN 101337204 A relates to bi-quaternary ammonium compounds in silicate mineral flotation, and a specific collector which applies a specific bi-quaternary ammonium compound in bauxite or ironstone reverse flotation desiliconization.

CN 101816981 A refers to a specific environmentally-friendly amine cationic collector and a using method thereof.

EP 1 584 674 A1 relates to an esterquat concentrate suitable for production of fabric softeners at lower temperatures comprising a) an esterquat compound; b) an organic solvent; c) water; d) a pH modifier.

EP 1 806 392 A1 refers to aqueous compositions containing a specific esterquat or mixtures of specific esterquats.

EP 1 876 224 A1 relates to a stable, homogenous and viscous softener formulation which contains less than 50% by weight of a specific esterquat compound.

US 2005/0189113 A1 refers to acidic treatment fluids that comprise an acid fluid and an ester-containing quaternary ammonium compound ("esterquat") and methods of their use.

EP 2 700 680 A1 relates to a process for manufacturing white pigment containing products. The white pigment containing products are obtained from at least one white pigment and impurities containing material via froth flotation using a specific collector agent.

U.S. Pat. No. 4,606,916 refers to specific quaternary oxalkylated polyesters prepared from oxalkylated fatty amines by polycondensation with a dicarboxylic acid and subsequent reaction with an alkylene oxide and a carboxylic acid or a mineral acid or with a quaternizing agent such as methyl chloride, are described. The compounds are suitable for use as cosmetic active compounds, in particular for cosmetic care of the hair.

EP 0 035 263 A2 relates to specific textile softeners which are polyesters containing tertiary amino groups or salts thereof with lower carboxylic acids, for example acetic acid or glycolic acid, and mineral acids.

However, the prior art methods for manufacturing products by reverse froth flotation have numerous disadvantages. The use of such collector agents is very expensive. Additionally, many of the known collector agents cause uncontrolled foaming in the reverse froth flotation process. Furthermore, many of the reverse froth flotation processes are limited in that they are selective, i.e. a significant part of the desired product is floated together with the impurities. Also a great number of the collector agents used so far is considered to be aquatic and environmental toxic. A further disadvantage of the known collector agent is that they decompose under flotation conditions and therewith loose efficiency.

Therefore, there is a need for an improved method for producing white pigments by flotation, which method avoids or reduces the problems described above in relation to the known methods. Such improved method for manufacturing white pigments from a white pigment and impurities containing material should especially be an easy to handle and ecological method. Also the effectiveness should be satisfactory.

At least some of the foregoing objects have been solved by the present invention.

According to one aspect of the present invention a process for manufacturing white pigment containing products is provided, characterised in that said process comprises the following steps:

a) providing at least one white pigment and impurities containing material;

b) providing at least one collector agent selected from the group consisting of compounds of formula (1)

$$H-[(AO)_x-\overset{(R^3)_t}{\underset{\underset{R^2}{|}}{\overset{|}{N^{(+)_t}}}}-(AO)_x-\underset{\underset{O}{\|}}{\overset{}{\text{}}}-R^1-\underset{\underset{O}{\|}}{\overset{}{\text{}}}]_p-(AO)_x-\overset{(R^3)_t}{\underset{\underset{R^2}{|}}{\overset{|}{N^{(+)_t}}}}-(AO)_x-H \quad (X^-)_t \quad (X^-)_t$$ (1)

R¹ is selected from the group consisting of
  i) a direct bond,
  ii) a $C_1$-$C_{20}$, linear or branched, saturated or unsaturated hydrocarbon chain optionally substituted by one or more —OH group(s), one or more methyl and/or methylene groups, a cycloalkylene group, a cycloalkenylene group and/or an arylene group, preferably
    A) an alkylene radical having from 1 to 20, more preferably from 1 to 10 carbon atoms, most preferably a substituted alkylene radical, wherein said substituted alkylene radical is substituted by 1 or 2 —OH groups, 1 or 2 methyl and/or methylene groups, a cycloalkylene group, a cycloalkenylene group and/or an arylene group, or
    B) an alkenylene radical having from 1 to 20, preferably from 1 to 10 carbon atoms, more preferably a substituted alkenylene radical, wherein said substituted alkenylene radical is substituted by 1 or 2 —OH groups, 1 or 2 methyl and/or methylene groups, a cycloalkylene group, a cycloalkenylene group and/or an arylene group;

$R^2$ is selected from the group consisting of a hydrocarbyl group having from 8 to 24 carbon atoms or a group of formula $R^4$—O—$(A'O)_w$-T-, wherein;
  $R^4$ represents a hydrocarbyl group having from 8 to 24 carbon atoms; w is a number within the range from 0 to 20;
  A'O is an alkyleneoxy group having from 2 to 4 carbon atoms; and
  T represents an alkylene group having from 1 to 6 carbon atoms;

$R^3$ is selected from the group consisting of a hydrocarbyl group or a benzyl group;
AO represents an alkyleneoxy group having from 2 to 4 carbon atoms;
X represents an anion derived from an alkylating agent $R^3X$;
x is a number within the range from 1 to 20;
p is a number within the range from 1 to 15;
t is 0 or 1;
y is 0 or 1; and
G represents a group of formula (2);

$$\sim\!\!\!\sim\!\!\overset{(R^3)_t}{\underset{\underset{B}{|}}{\overset{|}{N^{(+)_t}}}}-(CH_2)_s\!\sim\!\!\!\sim \quad (X^-)_t$$ (2)

wherein;
B represents an alkyl group having from 1 to 4 carbon atoms or represents a benzyl group;
s is 1, 2 or 3;
$R^3$, X and t are as defined above;
$N^+$ is connected to $R^2$ in formula (1); and
$(CH_2)_s$ is connected to the quaternary nitrogen atom in formula (1);

c) mixing said white pigment and impurities containing material of step a) and said collector agent of step b) in an aqueous environment to form an aqueous suspension;
d) passing gas through the suspension formed in step c);
e) recovering the white pigment containing product by removing the white pigment bearing phase from the aqueous suspension obtained after step d).

The inventors surprisingly found that the process for manufacturing white pigment containing products from at least one white pigment and impurities containing material and at least one collector agent according to formula (1)

$$H-[(AO)_x-\overset{(R^3)_t}{\underset{\underset{R^2}{|}}{\overset{|}{N^{(+)_t}}}}-(AO)_x-\underset{\underset{O}{\|}}{\overset{}{\text{}}}-R^1-\underset{\underset{O}{\|}}{\overset{}{\text{}}}]_p-(AO)_x-\overset{(R^3)_t}{\underset{\underset{R^2}{|}}{\overset{|}{N^{(+)_t}}}}-(AO)_x-H \quad (X^-)_t \quad (X^-)_t$$ (1)

is advantageous because the aforementioned collector agents effectively bind much more effective to the surface of the impurities than to the surface of the white pigments. Moreover, the collector agents according to the present invention show a high stability and do not decompose in critical amounts under flotation conditions.

Therefore, the inventive flotation process is very effective in comparison with known prior art processes. Furthermore, the inventive flotation process is very ecological since the used collector agents are less toxic in comparison with known prior art collector agents. The white pigment containing products obtained from the inventive process show good brightness and have a low yellow index.

A second aspect of the present invention relates to the use of the white pigment bearing phase obtained by the inventive process in paper, plastics, paint, coatings, concrete, cement, cosmetic, water treatment, food, pharma, ink and/or agriculture applications. The white pigment containing product is preferably used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

Advantageous embodiments of the present invention are defined in the corresponding sub-claims.

According to one embodiment, the process involves an indirect flotation step leading to the formation of a froth containing the impurities and a white pigment bearing phase with the white pigment containing product.

According to another embodiment, the white pigment is a white mineral pigment, preferably selected from the group consisting of natural calcium carbonate or ground calcium carbonate, calcium carbonate-comprising mineral material, dolomite, barite, aluminium oxide, titanium dioxide and mixtures of the foregoing.

According to another embodiment, the white mineral pigment is an alkaline earth metal carbonate, preferably a calcium carbonate and most preferably ground calcium carbonate (GCC).

According to another embodiment, the white pigment containing material comprises impurities selected from the group consisting of iron sulphides, iron oxides, graphite, silicates and mixtures thereof. The silicate may be selected from the group consisting of quartz, a mica, an amphibolite, a feldspar, a clay mineral and mixtures thereof and preferably is quartz.

According to another embodiment, the silicate is a white coloured silicate selected from the group consisting of wollastonite, kaolin, kaolinitic clay, calcined kaolinitic clay, montmorillonite, talc, diatomaceous earth, sepiolite and mixtures thereof.

According to another embodiment, the amount of white pigment in the white pigment and impurities containing material of step a) is from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

According to another embodiment, the ratio of white pigment:impurities in the white pigment and impurities containing material of step a) is from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

According to another embodiment, the white pigment and impurities containing material of step a) has a weight median grain diameter in the range of from 1 to 1,000 μm, preferably of from 3 to 700 μm, more preferably of from 5 to 500 μm and most preferably of from 10 to 80 μm or from 100 to 400 μm.

According to still another embodiment, the compound of formula (1) is characterized as follows:

$R^1$ represents an alkylene radical having from 2 to 6 carbon atoms, more preferably 4 carbon atoms;

$R^2$ represents a hydrocarbyl group having from 12 to 24 carbon atoms or a group of formula $R^4$—O-(A'O)$_w$-T-; wherein $R^4$ represents a hydrocarbyl group having from 12 to 24 carbon atoms;

w is a number ranging from 0 to 10, preferably from 0 to 3;

A'O represents an alkyleneoxy group having from 2 to 4 carbon atoms; and

T represents an alkylene group having from 1 to 4 carbon atoms, preferably having from 2 to 3 carbon atoms;

$R^3$ represents an alkyl group having from 1 to 4 carbon atoms;

X represents halogen, sulphate or carbonate;

AO represents an alkyleneoxy group having from 2 to 4 carbon atoms, preferably having 2 carbon atoms;

x is a number within the range from 1 to 10; more preferably within the range from 1 to 6; and p is a number within the range from 1 to 10, preferably within the range from 1 to 5.

According to another embodiment the compound as provided in step b) is selected from the group consisting of compounds of formula (1a):

$$H-\!\!\left[(AO)_x-\underset{\underset{R^2}{|}}{\overset{\overset{(R^3)_t}{|}(+)_t}{N}}-(AO)_x-\right]\!\!\!\!\underset{O}{\overset{}{\|}}\!\!-R^1-\!\!\underset{O}{\overset{}{\|}}\!\!\left[-(AO)_x-\underset{\underset{R^2}{|}}{\overset{\overset{(R^3)_t}{|}(+)_t}{N}}-(AO)_x\right]\!\!-H \quad (1a)$$

$(X^-)_t \qquad\qquad (X^-)_t$ wherein,

AO, p, t, x $R^1$, $R^2$, $R^3$ and X are as defined in the first embodiment, preferably as defined in the previous embodiment.

According to still another embodiment the compound of formula (1a) is characterized as follows:

$R^1$ represents an alkylene radical having from 1 to 20, preferably from 1 to 10 carbon atoms, preferably having form 2 to 6 carbon atoms and more preferably having 4 carbon atoms;

$R^2$ represents a hydrocarbyl group having from 8 to 24 carbon atoms, preferably having from 12 to 24 carbon atoms;

$R^3$ represents a hydrocarbyl group having from 1 to 4 carbon atoms, preferably an alkyl group having 1 or 2 carbon atoms and more preferably is a methyl group;

AO is an alkyleneoxy group, preferably an ethoxy group;

X is an anion derived from an alkylating agent $R^3X$; preferably chloride or sulphate;

x is a number within the range from 1 to 15, preferably within the range from 2 to 10 and more preferably within the range from 1 to 6;

p is a number within the range from 1 to 15; and t is 0 or 1, preferably 1.

According to another embodiment, the compound of formula (1a) possesses at least one of the following characteristics:

$R^1$ is derived from a dicarboxylic acid, a dicarboxylic acid chloride, a diester of a dicarboxylic acid, an anhydride of a dicarboxylic acid, preferably $R^1$ is derived from a compound selected from the group consisting of oxalic acid, malonic acid, succinic acid, glutaric acid, glutaconic acid, adipic acid, muconic acid, pimelic acid, phthalic acid, terephthalic acid, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides of these compounds and mixtures thereof, more preferably $R^1$ is derived from a compound selected from the group consisting of oxalic acid, malonic acid, succinic acid, glutaric acid, adipic acid, pimelic acid, phthalic acid, tetrahydrophthalic acid, malic acid, tartaric acid, the corresponding acid chlorides, methyl or ethyl esters or anhydrides of these compounds and mixtures thereof, and most preferably adipic acid;

$R^2$ is derived from a fatty amine selected from the group consisting of 2-ethylhexylamine, 2-propylheptylamine, n-octylamine, n-decylamine, n-dodecylamine, (coco alkyl)-amine, (palm oil alkyl) amine, n-tetradecylamine, n-hexadecylamine, n-octadecylamine, oleylamine, (tallow alkyl)-amine, (hydrogenated tallow alkyl)-amine, (rape seed alkyl)-amine, (soya alkyl)-amine, erucyl amine, N-(n-decyl)-N-methyl-trimethylene-diamine, N-(n-dodecyl)-N-methyl-trimethylene-diamine, N-(coco alkyl)-N-methyl-trimethylene-diamine, N-(rape seed alkyl)-N-methyl-trimethylene-diamine, N-(soya alkyl)-N-methyltrimethylene-diamine, N-(tallow alkyl)-N-methyl-trimethylene-diamine, N-(hydrogenated tallow alkyl)-N-methyl-trimethylene-diamine, N-(erucyl)-N-methyl-trimethylene-diamine, isotridecyloxypropylamine and mixtures thereof, preferably (coco alky)-amine or (tallow alkyl)-amine;

$R^3$ is derived from an alkylating agent selected from the group consisting of dimethyl sulphate, diethyl sulphate, dimethyl carbonate, benzyl chloride, methyl bromide, methyl chloride, methyl iodide, preferably dimethyl sulphate or methyl chloride and mixtures thereof.

According to another embodiment the compound of formula (1a) possesses the following characteristics:

$R^1$ is derived from a compound selected from the group consisting of adipic acid, maleic anhydride, sebacic acid and glutaric acid;

$R^2$ is derived from an ethoxylated fatty amine selected from the group consisting of ethoxylated ($C_{16}$-$C_{18}$) and $C_{18}$-unsaturated alkylamine, ethoxylated ($C_8$-$C_{16}$) and $C_{18}$-unsaturated alkylamine, ethoxylated (coco alkyl)-amine, ethoxylated oleylamine, ethoxylated (tallow alkyl)-amine and ethoxylated (palm oil alkyl)-amine; and $R^3$ is derived from an alkylating agent selected from the group consisting of dimethyl sulphate, diethyl sulphate and methyl chloride, and preferably is methyl chloride.

According to another embodiment, the collector agent of step b) consists of one or more compounds of formula (1) and/or (1a).

According to another embodiment, the aqueous suspension obtained in step c) has a pH from 7 to 10, preferably from 7.5 to 9.5 and more preferably from 8.5 to 9.

According to another embodiment, the collector agent is added in step c) in an amount of from 1 to 5,000 ppm based on the total dry weight of the white pigment and impurities containing material of step a), preferably in an amount of from 20 to 2,000 ppm, more preferably in an amount of from 30 to 1,000 ppm, and most preferably in an amount of from 50 to 800 ppm based on the total dry weight of said white pigment and impurities containing material of step a).

According to another embodiment, the aqueous suspension obtained in step c) has a solids content of between 5 and 80 wt.-% based on the total weight of the solids in the suspension, preferably of between 10 and 70 wt.-%, more preferably of between 20 and 60 wt.-% and most preferably of between 25 and 55 wt.-% based on the total weight of the solids in the suspension.

According to another embodiment, one or more additives are added to the aqueous suspension prior to, during or after step c), wherein the additives are selected from the group comprising pH-adjusting agents, solvents, depressants, polyelectrolytes, frothers and collector agents other than the collector agents according to formula (1) and/or (1a).

According to another embodiment, the aqueous suspension obtained in step c) is ground during and/or after step c).

According to another embodiment, the gas in step d) is air.

According to another embodiment, the suspension in step d) has a temperature of between 5 and 40° C., preferably between 10 and 40° C., more preferably between 10 and 30° C. and most preferably between 15 and 25° C.

According to another embodiment, the white pigment bearing phase obtained from step e) is dispersed and/or ground before and/or after step e) and preferably is dispersed and/or ground in the presence of at least one dispersing agent and/or at least one grinding aid agent.

According to another embodiment, the white pigment containing product comprises at least 95 wt.-% white pigment, based on the dry weight, preferably of at least 98 wt.-%, more preferably of at least 99 wt.-% and most preferably of at least 99.9 wt.-% based on the dry weight.

According to another embodiment a process for manufacturing white pigment containing products is provided, characterised in that said process comprises the following steps:

a) providing at least one white pigment and impurities containing material;
b) providing at least one collector agent selected from the group consisting of compounds of formula (1):

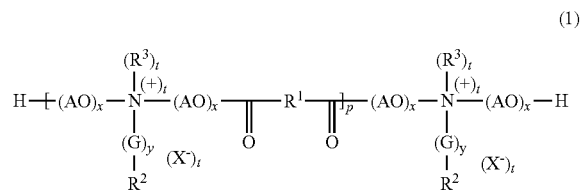

(1)

$R^1$ is selected from the group consisting of a direct bond, an alkylene radical having from 1 to 10 carbon atoms, a substituted alkylene radical, wherein said alkylene radical is substituted by 1 or 2 —OH groups, a cycloalkylene group, a cycloalkenylene group and an arylene group;

$R^2$ is selected from the group consisting of a hydrocarbyl group having from 8 to 24 carbon atoms or a group of formula $R^4$—O-(A'O)$_w$-T-, wherein;

$R^4$ represents a hydrocarbyl group having from 8 to 24 carbon atoms;

w is a number within the range from 0 to 20;

A'O is an alkyleneoxy group having from 2 to 4 carbon atoms; and

T represents an alkylene group having from 1 to 6 carbon atoms;

$R^3$ is selected from the group consisting of a hydrocarbyl group or a benzyl group;

AO represents an alkyleneoxy group having from 2 to 4 carbon atoms;

X represents an anion derived from an alkylating agent $R^3X$;

x is a number within the range from 1 to 20;
p is a number within the range from 1 to 15;
t is 0 or 1;
y is 0 or 1; and
G represents a group of formula (2);

(2)

wherein;

B represents an alkyl group having from 1 to 4 carbon atoms or represents a benzyl group;

s is 1, 2 or 3;

$R^3$, X and t are as defined above;

$N^+$ is connected to $R^2$ in formula (1); and $(CH_2)_s$ is connected to the quaternary nitrogen atom in formula (1);

c) mixing said white pigment and impurities containing material of step a) and said collector agent of step b) in an aqueous environment to form an aqueous suspension;

d) passing gas through the suspension formed in step c);

e) recovering the white pigment containing product by removing the white pigment bearing phase from the aqueous suspension obtained after step d).

A "pigment" in the meaning of the present invention is a solid colouring material having a defined chemical composition and a characteristic crystalline structure. Pigments can be inorganic pigments. Pigments may be synthetic or natural pigments. Furthermore, pigments are insoluble in water and, thus, resulting in a suspension when contacting them with water.

A "white pigment" in the meaning of the present invention is a pigment that has a white appearance when illuminated by daylight.

A "white mineral pigment" in the meaning of the present invention is an inorganic white pigment that may be obtained naturally and specifically includes natural calcium carbonate or ground calcium carbonate (in particular limestone, chalk, marble, calcite), calcium carbonate-comprising mineral material (may be with a 70 wt.-% minimum content of $CaCO_3$, based on the weight of the mineral), dolomite, barite, aluminium oxide, titanium dioxide and mixtures of the foregoing.

An "alkaline earth metal carbonate" in the meaning of the present invention is a carbonate that comprises at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$.

"Calcium carbonate" in the meaning of the present invention includes natural calcium carbonate and may be a ground calcium carbonate (GCC).

"Natural calcium carbonate" in the meaning of the present invention is a calcium carbonate (calcite) obtained from natural sources, such as marble, limestone, or chalk.

"Ground calcium carbonate" (GCC) in the meaning of the present invention is a natural calcium carbonate that is processed through a wet and/or dry treatment such as grinding, screening and/or fractionating, for example by a cyclone or classifier. "Impurities" in the meaning of the present invention are substances that differ from the chemical composition of the desired white pigment.

A "collector agent" in the meaning of the present invention is a chemical compound that is adsorbed by the envisaged particles either by chemisorption or by physisorption. The collector agent renders the surface of the impurities more hydrophobic.

A "gas" in the meaning of the present invention is a sample of matter that conforms to the shape of a container in which it is held and acquires a uniform density inside the container, even in the presence of gravity and regardless of the amount of substance in the container. If not confined to a container, gaseous matter, also known as vapour, will disperse into space. The term gas is also used in reference to the state, or condition, of matter having this property. A gas is composed of molecules that are in constant random motion. According to the present invention the compound has to be in a gaseous state at room temperature (20±2° C.) and at standard atmospheric pressure (101,325 Pa or 1.01325 bar).

A "suspension" or "slurry" in the meaning of the present invention comprises non-dissolved solids in an aqueous medium, and optionally further additives, and usually contains large amounts of solids and, thus, is more viscous and can be of higher density than the aqueous medium supporting the suspension.

The "particle size" of fine (i.e. a $d_{50}$<5 µm) white pigment and impurities containing material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size of fine (i.e. a $d_{50}$<5 µm) white pigment and impurities containing material is specified as weight median particle size $d_{50}$ unless indicated otherwise. The $d_{98}$ value is the particle size at which 98 wt.-% of all particles are smaller than that particle size. Fine particle sizes (i.e. a $d_{50}$<5 µm) were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

The "particle size" of a coarse (i.e. a $d_{50}$ above 5 µm) white pigment and impurities containing material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smallerthan that particle size. The $d_{50}$ value is thus the weight median particle size, i.e. 50 wt.-% of all grains are bigger and the remaining 50 wt.-% are smaller than this particle size. For the purpose of the present invention the particle size of coarse (i.e. a $d_{50}$>5 µm) white pigment and impurities containing material is specified as weight median particle size $d_{50}$ unless indicated otherwise. The $d_{98}$ value is the particle size at which 98 wt.-% of all particles are smaller than that particle size. Coarse particle sizes (i.e. a $d_{50}$>5 µm) were determined by using a Malvern Mastersizer 2000 Laser Diffraction System from the company Malvern, UK. The raw data obtained by the measurement are analysed using the Mie theory, with a defined RI (particle refractive index) of 1.57 and iRI (absorption index) of 0.005 and Malvern Application Software 5.60. The measurement was performed with an aqueous dispersion. For this purpose, the samples were dispersed using a high-speed stirrer. The weight determined particle size distribution may correspond to the volume determined particle size if the density of all the particles is equal.

A "specific surface area (SSA)" of a calcium carbonate product in the meaning of the present invention is defined as the solids surface area of a bulk dray sample, representative of all the distribution of particles present, divided by the mass of the bulk sample. As used herein the specific surface area is measured by adsorption using the BET isotherm (ISO 9277:2010) and is specified in $m^2/g$.

A "conventional flotation process" or a "direct flotation process" in the meaning of the present invention is a flotation process in which the desirable white pigments are directly floated and collected from the produced froth leaving behind a suspension containing the impurities.

A "reverse flotation process" or "indirect flotation process" in the meaning of the present invention is a flotation process in which the impurities are directly floated and collected from the produced froth leaving behind a suspension containing the desired white pigments.

The inventive process for manufacturing white pigment containing products involves the provision of at least one "white pigment and impurities containing material" and at least one inventive collector agent. Said white pigment and impurities containing material and said collector agent are mixed in an aqueous environment to form an aqueous suspension. Afterwards or during mixing a gas is passed through the obtained aqueous suspension and the white pigment containing product is recovered by removing the white pigment bearing phase from the aqueous suspension obtained after passing the gas through the suspension.

In the following, details and preferred embodiments of the process for manufacturing white pigment containing products will be set out in more detail. It is to be understood that these embodiments or details apply also for the white pigments containing product obtained by the inventive process and for the inventive use of the white pigment bearing phase also obtained by the inventive process.

The White Pigment and Impurities Containing Material

Step a) of the process of the invention refers to the provision of at least one white pigment and impurities comprising mineral.

A white pigment in the meaning of the present invention is a pigment that has a white appearance when viewed in daylight. The white nature of the white pigments is predominately based on the relatively Low light absorption in combination with an unselective light scattering of the visual light at the pigment-air interface. The white pigments according to the present invention are inorganic white pigments that may be obtained naturally and synthetically and specifically include natural calcium carbonate or ground calcium carbonate (in particular limestone, chalk, marble, calcite), calcium carbonate-comprising mineral material (can be with a 50 wt.-% minimum content of $CaCO_3$, based on the weight of the mineral), dolomite, barite, aluminium oxide, titanium dioxide and mixtures of the foregoing.

White pigments may be white mineral pigments. White mineral pigments in the meaning of the present invention are inorganic white pigments that may be obtained naturally. Beside the above mentioned natural calcium carbonate or ground calcium carbonate (in particular limestone, chalk, marble, calcite), calcium carbonate-comprising mineral material (can be with a 50 wt.-% minimum content of $CaCO_3$, based on the weight of the mineral), dolomite, barite, and mixtures of the foregoing, the white mineral pigments include aluminium oxide $Al_2O_3$ containing minerals, for example $\gamma$-$Al_2O_3$ having a cubic structure and $\alpha$-$Al_2O_3$ having a rhombohedral (trigonal) structure. Additionally, the aluminium oxide containing minerals may comprise other elements such as for example sodium in $Na_2O \cdot 11Al_2O_3$, commonly known as diaoyudaoit. Other inventive white mineral pigments are titanium dioxide $TiO_2$ containing minerals, for example rutile, anatase or brookite. Further white mineral pigments are white oxide minerals such as barium sulphate ($BaSO_4$), zinc oxide (ZnO), zirconium dioxide ($ZrO_2$), or tin dioxide ($SnO_2$), or white sulphate minerals and white sulphide minerals such as zinc sulphide (ZnS) or lead carbonate ($PbCO_3$).

Preferably, the white mineral pigment is au alkaline earth metal carbonate.

Alkaline earth metal carbonates in the meaning of the present invention are carbonates that comprise at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$ and, preferably, magnesium and calcium. The alkaline earth metal carbonates in the meaning of the present invention are, for example, beryllium carbonate, magnesium carbonate, calcium carbonate, strontium carbonate, barium carbonate or radium carbonate.

According to one embodiment of the present invention, the alkaline earth metal carbonate consist of only one alkaline earth metal, for example, calcium. The alkaline earth metal carbonate may alternatively consist of a mixture of two alkaline earth metals as for example calcium and magnesium and, thus, the alkaline earth metal carbonate may be a calcium magnesium carbonate, e.g., dolomite. The alkaline earth metal carbonate may comprise a mixture of two or more alkaline earth metals. Additionally, the alkaline earth metal carbonate may comprise further cations as for example sodium in gaylussite (sodium calcium carbonate).

The white pigment may comprise more than one alkaline earth metal carbonate. For example, the white pigment may comprise one magnesium carbonate and one calcium carbonate. Alternatively, the white pigment may consist of only one alkaline earth metal carbonate.

The white pigment may comprise a mixture of two or more white mineral pigments. For example the white pigment may comprise one alkaline earth metal carbonate and an inorganic white pigment that is selected from the group consisting of aluminium dioxide, titanium dioxide, barium sulphate, zinc oxide, zirconium dioxide, or tin dioxide, white sulphate or sulphide minerals.

Preferably, the alkaline earth metal carbonate may be a calcium carbonate.

Calcium carbonate or natural calcium carbonate is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, aluminium oxide etc.

The source of calcium carbonate may be selected from marble, chalk, calcite, dolomite, limestone, or mixtures thereof. Preferably, the source of calcium carbonate may be selected from marble.

Preferably, the alkaline earth metal carbonate may be a ground calcium carbonate (GCC). Ground calcium carbonate (GCC) is understood to be obtained by grinding the calcium carbonate either dry or alternatively wet followed by a subsequent drying step.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be dewatered by well-known processes, e.g. by filtration, centrifugation or forced evaporation prior to dewatering. An additional step of drying may be carried out in a single step such as spray drying, or in at least two steps.

Preferably, the white pigment may consist of only one ground calcium carbonate. Alternatively, the white pigment may consist of a mixture of two ground calcium carbonates selected from different sources of ground calcium carbonate. The white pigment may also comprise a mixture of two or more ground calcium carbonates selected from different sources of ground calcium carbonate. For example, the white pigment may comprise one GCC selected from dolomite and one GCC selected from calcite marble. Additionally to the GCC the white pigment may comprise further white mineral pigments.

The white pigment and impurities containing material will contain white pigments as defined above and impurities. Impurities in the meaning of the present invention are substances that differ from the chemical composition of the white pigment and, therefore, are no white pigments.

The impurities to be removed or reduced by the process according to the present invention are compounds that have, for example a grey, black, brown, red, or yellow colour or any other colour affecting the white appearance of the white pigment material. Alternatively, the impurities to be removed or reduced have a white colour but have different physical properties than the white pigments and, therefore, adversely affect the white pigments.

According to a preferred embodiment the starting material, e.g., the white pigment and impurities containing material may comprise impurities selected from iron sulphides.

Iron sulphides or iron sulphates in the meaning of the present invention are understood to be chemical compounds of iron and sulphur comprising a wide range of stochiometric formulae and different crystalline structures. For example the iron sulphide can be iron(II) sulphide FeS (magnetopyrite) or pyrrhotite $Fe_{1-x}S$ wherein x is from 0 to 0.2. The iron sulphide can also be an iron(II) disulphide $FeS_2$ (pyrite or marcasite). The iron sulphides can also contain other elements then iron and sulphur as for example nickel in the form of mackinawite $(Fe, Ni)_{1+x}S$ wherein x is from 0 to 0.1.

The impurities in the white pigment and impurities containing material may also be iron oxides.

Iron oxides in the meaning of the present invention are understood to be chemical compounds composed of iron and oxide. Iron oxide comprises, for example iron(II) oxide FeO, also known as wüstite, iron(I, III) oxides $Fe_3O_4$, also known as magnetite and iron(III) oxide $Fe_2O_3$. The iron oxides include also iron hydroxides and iron oxyhydroxides that contain beneath the elements iron and oxygen, the additional element hydrogen. Iron hydroxide comprises, for example iron(II) hydroxide $Fe(OH)_2$ and iron(III) hydroxide $Fe(OH)_3$, also known as bernalite. Iron oxyhydroxide comprises, for example α-FeOOH also known as goethite forming prismatic needle-like crystals, γ-FeOOH also known as lepidocrocite forming orthorhombic crystal structures, δ-FeOOH also known as feroxyhyte crystallizing in the hexagonal system and ferrihydrite $FeOOH·0.4H_2O$. The iron oxides can also contain additional elements as, for example, sulphur in $Fe_8O_8(OH)_6(SO_4)·nH_2O$ also known as schwertmannite or chloride in FeO(OH,Cl) also known as akaganeite.

The white pigment and impurities containing material may comprise impurities that are selected from graphite.

Graphite in the meaning of the present invention is understood to be an allotrope of carbon. There are three principal types of natural graphite: crystalline flake graphite, amorphous graphite and lump graphite. Crystalline flake graphite (or flake graphite for short) occurs as isolated, flat, plate-like particles with hexagonal edges if unbroken and, when broken, the edges can be irregular or angular. Amorphous graphite occurs as fine particles and is the result of thermal metamorphism of coal, the last stage of coalification, and is sometimes called meta-anthracite. Very fine flake graphite is sometimes called amorphous in the trade. Lump graphite (also called vein graphite) occurs in fissure veins or fractures and appears as massive platy intergrowths of fibrous or acicular crystalline aggregates.

Alternatively the impurities in the white pigment and impurities containing material may be silicates. The silicates may be colouring or abrasive.

Silicates or silicate minerals in the meaning of the present invention are understood to be compounds that comprise silicon and oxygen. Additionally, the silicates can comprises further ions such as for example aluminium ions, magnesium ions, iron ions or calcium ions. The silicates and silicate minerals can be selected from neosilicates, sorosilicates, cyclosilicates, inosilicates, phyllosilicates, and tectosilicates and amorphous silicates. Neosilicates are silicate minerals in which the $SiO_4$ tetrahedra are isolated and have metal ions as neighbours. Commonly known neosilicates are zircon, willemite, olivine, mullite, forsterite, aluminosilicates or fayalite. Sorosilicates are silicate minerals which have isolated double tetrahedral groups with a silicon to oxygen ratio of 2:7. Commonly known sorosilicates are ilavite, gehlenite, epidote or kornerupine. Cyclosilicates are ring silicates that contain rings of linked $SiO_4$ tetrahedra wherein the silicon to oxygen ratio is 1:3. Commonly known cyclosilicates are benitonite, beryl or tourmaline. Inosilicates or chain silicates are silicate minerals which have interlocking chains of silicate tetrahedra with either $SiO_3$ in a 1:3 ratio for single chains or $Si_4O_{11}$ in a 4:11 ratio for double chains. Commonly known inosilicates are enstatite, wollastonite, rhodenite, diopside or amphibolite as for example grunerite, cummingtonite, actinolithe or hornblende. Phyllosilicates are sheet silicates that form parallel sheets of silicate tetrahedra with $Si_2O_5$ or a silicon oxygen ration of 2:5. Commonly known phyllosilicates are clay minerals, for example talc, kaoline, kaolinitic clay, calcined kaolinitic clay, halloysite, dickite, vermiculite, nontronite, sepiolite or montmorillonite, mica minerals, for example, biotite, muscovite, phlogopite, lepidolite or glauconite, or a chlorite mineral, for example clinochlore. Tectosilicates or framework silicates have a three-dimensional framework of silicate tetrahedra with $SiO_2$ tetrahedra or a silicon oxygen ration of 1:2. Commonly known tectosilicates are quartz minerals as for example quartz, tridymite and cristobalite, feldspar minerals as for example potassium feldspars comprising orthoclase and microline, sodium or calcium feldspars comprising plagioclase, albite and andesine or scapolite and zeolithe. Amorphous silicates are for example diatomaceous earth or opale.

The silicate may be selected from the group consisting of quartz, a mica, an amphibolite, a feldspar, a clay mineral and mixtures thereof and, preferably, may be quartz.

The inventive process is especially contemplated for separating white pigments from impurities that consist of quartz and/or additional silicates.

Preferably the impurity in the white pigments and impurities containing material consists only of quartz.

Alternatively, the impurity or impurities in the white pigment and impurities containing material may comprise silicates that have a white colour. For example, the impurities may comprise silicates such as wollastonite, kaolin, kaolinitic clay, calcined kaolinitic clay, montmorillonite, talc, diatomaceous earth or sepiolite. In a preferred embodiment of the invention, the impurity consists of silicates that have a white colour and more preferably the impurity consists of only one white coloured silicate. For example, the impurity may consist only of wollastonite, kaolin, kaolinitic clay, calcines kaolinitic clay, montmorillonite, talc, diatomaceous earth or sepiolite. These impurities obtained and separated according to the inventive flotation method may be further processed and used in suitable applications. The impurities containing only white coloured silicates and, preferably containing only one white coloured silicate obtained by the inventive process may be used in the same way than the white pigment containing product.

In a preferred embodiment, the amount of white pigment in the white pigment and impurities containing material of step a) may be from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

In another preferred embodiment, the weight ratio of white pigment:impurities in the white pigment and impurities containing material of step a) may be from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

The total amount of the white pigment and the impurities in the white pigment and impurities containing material of step a) may represent at least 90 wt.-% relative to the total weight of the white pigment and impurities containing material, preferably at least 95 wt.-%, more preferably at least 98 wt.-%, and most preferably at least 99 wt.-% relative to the total weight of the white pigment and impurities containing material.

As set out before, in a preferred embodiment the impurity in the white pigment and impurities containing material may consist of a silicate. In this case, the total amount of the white pigment and the silicate in the white pigment and impurities containing material of step a) represents at least 90 wt.-% relative to the total weight of the white pigment and impurities containing material, preferably at least 95 wt.-%, more preferably at least 98 wt.-%, and most preferably for at least 99 wt.-%.

Alternatively, the white pigment and impurities containing material may consist of white pigment and silicate. Preferably, the white pigment and impurities containing material may consist of white pigment and quartz. Alternatively, the white pigment and impurities containing material may consist of white pigment and a white coloured silicate that is selected from the group consisting of wollastonite, kaolin, kaolinitic clay, calcines kaolinitic clay, montmorillonite, talc, diatomaceous earth or sepiolite.

The white pigment and impurities containing material of step a) may have a weight median grain diameter in the range of from 1 to 1,000 μm, preferably of from 3 to 700 μm, more preferably of from 5 to 500 μm and most preferably of from 10 to 80 μm or from 100 to 400 μm.

In another preferred embodiment the white pigment and impurities containing material of step a) may have a weight median grain diameter in the range of from 1 to 1,000 μm, preferably of from 3 to 500 μm, more preferably of from 5 to 100 μm and most preferably of from 10 to 80 μm if the subsequent flotation process is a standard flotation process.

A standard flotation process in the meaning of the present invention is a flotation process that is performed after grinding and/or classification of the white pigment and impurities containing material.

In another preferred embodiment the white pigment and impurities containing material of step a) may have a weight median grain diameter in the range of from 1 to 1,000 μm, preferably of from 10 to 700 μm, more preferably of from 50 to 500 μm and most preferably of from 100 to 400 μm if the subsequent flotation process is a coarse flotation process. A coarse flotation process in the meaning of the present invention is a flotation process that is performed within the first grinding loop of the white pigment and impurities containing material.

The Collector Agent

Step b) of the process of the present invention refers to the provision of at least one collector agent.

A collector agent in the meaning of the present invention is a chemical compound that is adsorbed by the envisaged particles either by chemisorption or by physisorption. The collector agents according to the present invention have the general formula (1),

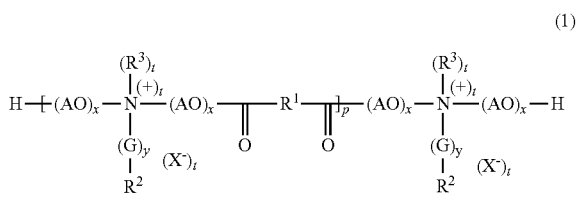

(1)

wherein;
$R^1$ is selected from the group consisting of
i) a direct bond,
ii) a $C_1$-$C_{20}$, linear or branched, saturated or unsaturated hydrocarbon chain optionally substituted by one or more —OH group(s), one or more methyl and/or methylene groups, a cycloalkylene group, a cycloalkenylene group and/or an arylene group, preferably
A) an alkylene radical having from 1 to 20, more preferably from 1 to 10 carbon atoms, most preferably a substituted alkylene radical, wherein said substituted alkylene radical is substituted by 1 or 2 —OH groups, 1 or 2 methyl and/or methylene groups, a cycloalkylene group, a cycloalkenylene group and/or an arylene group, or
B) an alkenylene radical having from 1 to 20, preferably from 1 to 10 carbon atoms, more preferably a substituted alkenylene radical, wherein said substituted alkenylene radical is substituted by 1 or 2 —OH groups, 1 or 2 methyl and/or methylene groups, a cycloalkylene group, a cycloalkenylene group and/or an arylene group;
$R^2$ is selected from the group consisting of a hydrocarbyl group having from 8 to 24 carbon atoms or a group of formula $R^4$—O-(A'O)$_w$-T-, wherein;
$R^3$ represents a hydrocarbyl group having from 8 to 24 carbon atoms;
w is a number within the range from 0 to 20;
A'O is an alkyleneoxy group having from 2 to 4 carbon atoms; and
T represents an alkylene group having from 1 to 6 carbon atoms;
$R^3$ is selected from the group consisting of a hydrocarbyl group or a benzyl group;

AO represents an alkyleneoxy group having from 2 to 4 carbon atoms;

X represents an anion derived from an alkylating agent $R^4X$;

x is a number within the range from 1 to 20;
p is a number within the range from 1 to 15;
t is 0 or 1;
y is 0 or 1; and
G represents a group of formula (2);

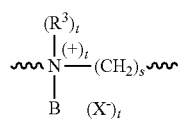
(2)

wherein;
B represents an alkyl group having from 1 to 4 carbon atoms or represents a benzyl group;
s is 1, 2 or 3;
$R^3$, X and t are as defined above;
$N^+$ is connected to $R^2$ in formula (1); and
$(CH_2)_3$ is connected to the quaternary nitrogen atom in formula (1);

In a preferred embodiment the compound according to general formula (1) is the compound according to formula (1a).

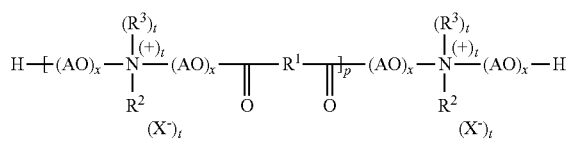
(1a)

wherein, AO, p, t, x, $R^1$, $R^2$, $R^3$ and X are as defined above.

It is to be understood that the nitrogen atom in formula (1) and (1a) has a positive charge when t=1 but is neutral when t=0.

The compounds of formula (1) and (1a) may be prepared according to known preparations techniques.

For example, compounds of formula (1) and (1a) may be easily obtained by condensation of a dicarboxylic acid or a derivative thereof having the formula (1a) or (Ib),

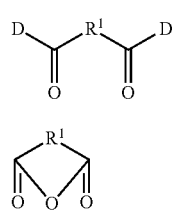
(Ia)

(Ib)

where D- is —OH, —Cl or —OR', where R' is a $C_1$-$C_4$ alkyl group; $R^1$ is selected from the group consisting of
i) a direct bond,
ii) a $C_1$-$C_{20}$, linear or branched, saturated or unsaturated hydrocarbon chain optionally substituted by one or more —OH group(s), one or more methyl and/or methylene groups, a cycloalkylene group, a cycloalkenylene group and/or an arylene group, preferably
A) an alkylene radical of formula —$(CH_2)_z$—, in which z is an integer from 1 to 20, more preferably from 1 to 10, even more preferably from 2 to 6 and even more preferably 4, most preferably a substituted alkylene radical, wherein said substituted alkylene radical is substituted by 1 or 2 —OH groups, 1 or 2 methyl and/or methylene groups, a cycloalkylene group, a cycloalkenylene group and/or an arylene group, or
B) an alkenylene radical having from 1 to 20, preferably from 1 to 10 carbon atoms, more preferably a substituted alkenylene radical, wherein said substituted alkenylene radical is substituted by 1 or 2 —OH groups, 1 or 2 methyl and/or methylene groups, a cycloalkylene group, a cycloalkenylene group and/or an arylene group;

with an alkoxylated fatty amine having the formula (II),

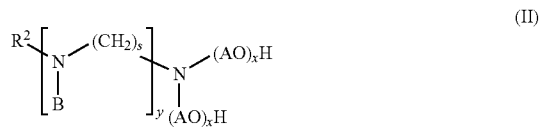
(II)

wherein $R^2$ is selected from the group consisting of a hydrocarbyl group having 8 to 24 carbon atoms, preferably 12 to 24 carbon atoms or a group of formula $R^4$—O-$(A'O)_w$-T-, wherein;

$R^4$ represents a hydrocarbyl group having from 8 to 24 carbon atoms, preferably 12 to 24 carbon atoms;
w is a number within the range from 0 to 20, preferably from 0 to 10 and more preferably from 0 to 3;
A'O is an alkyleneoxy group having from 2 to 4 carbon atoms;
T represents an alkylene group having from 1 to 6 carbon atoms; preferably from 1 to 4 carbon atoms and most preferably from 2 to 3 carbon atoms;
AO represents an alkyleneoxy group having from 2 to 4 carbon atoms, preferably 2 carbon atoms;
B represents an alkyl group having from 1 to 4 carbon atoms or represents a benzyl group;
x represents a number within the range from 1 to 20, preferably within the range from 1 to 10, more preferably between the range from 1 to 6;
s is 1, 2 or 3, preferably 2 or 3;
y is 0 or 1;
for the preparation of compound (1a) the preferred alkoxylated fatty amine has the formula (IIa),

(IIa)

wherein, AO, x and $R^2$ are as defined above;
or of a product obtainable by partial or total quaternisation of the alkoxylated fatty amine of formula (II) or (IIa); optionally said reaction between the dicarboxylic acid according to formula (I) and the alkoxylated fatty amine according to formula (II) or (IIa) is being followed by a further reaction step wherein part or all of the nitrogen atoms are quaternised by reaction with an alkylating agent $R^3X$, where $R^3$ is a hydrocarbyl group, preferably a $C_1$-$C_4$ alkyl group or the benzyl group, and X is an anion derived from the alkylating agent $R^3X$.

It is to be understood that when a compound of formula (II) or (IIa) contains more than one $(AO)_x$ group, the value of the integers x may be the same or different, independently from one another. Similarly, when more than one y is present, all "y" are, independently form one another, identical or different.

The esterification condensation reactions taking place between the compounds of formula (1a) or formula (Ib) and formula (II) or formula (IIa) are well-known in the art. The reactions are preferably being performed in the presence of an esterification catalyst, such as a Brönstedt or Lewis acid, for example methanesulphonic acid, p-toluenesulphonic acid, hypophosphoric acid, citric acid or boron trifluoride ($BF_3$).

When a dicarboxylic acid derivative of formula (1a) is used, wherein D is O—R', the reaction is a transesterification, which alternatively could be performed in the presence of an alkaline catalyst. Alternatively, other conventional techniques known by the person skilled in the art could be used starting from other derivatives of the dicarboxylic acids, such as from anhydrides or their acid chlorides.

The reactions could take place with or without solvents added. If solvents are present during the reaction, the solvents should be inert to esterification, e.g. toluene or xylene.

The esterification condensation reaction between the compounds (Ia) or (Ib) and (II) or (IIa) is suitably effected by heating the mixture at a temperature between 120 and 280° C. for a period of from 2 to 20 hours, optionally at reduced pressure of from 5 to 200 mbar.

When t in formula (I) is 0 the product is a tertiary polyesteramine compound, and when t is 1 the product is a polyester polyquaternary ammonium compound. Quaternisation is a reaction type that is well-known in the art. For the quaternisation step, the alkylating agent $R^3X$ is suitably selected from the group consisting of dimethyl sulphate, diethyl sulphate, dimethyl carbonate, benzyl chloride, methyl bromide, methyl chloride, methyl iodide, preferably dimethyl sulphate or methyl chloride and mixtures thereof.

The quaternisation may be performed on the condensation product of compounds, (Ia) or (Ib) and (II) or (IIa). It is also possible to carry out the quaternisation of the compound according to formula (II) or (IIa) in a first step and then carry out the esterification of compounds, (Ia) or (Ib) and quaternised (II) or (IIa). Either a part of, or all of, the nitrogen atoms may be quaternised by reaction with an alkylating agent, e.g. methyl chloride or dimethyl sulphate, to obtain a product that is partly or totally quaternised. Also, the two processes can be combined such that first a partially quaternised compound is esterified and the resulting polyester is further quaternised.

Quaternisation reactions are normally performed in water or a solvent, such as iso-propanol or ethanol, or in mixtures thereof. Other alternative solvents could be ethylene glycol monobutyl ether, di(ethylene glycol) monobutyl ether, and other ethylene- and propylene glycols, such as monoethylene glycol and diethylene glycol. The reaction temperature of the quaternising reaction is suitably in the range from 20 to 100° C., preferably at least 40° C., more preferably at least 50° C. and most preferably at least 55° C., and preferably at most 90° C.

The expression "totally quaternised" in the meaning of the present invention means that "all of the nitrogen atoms are quaternised" or that "all nitrogen atoms of the product are quaternary" which means that the total amount of basic nitrogen per gram of compound is less than or equal to 0.2 mmol, preferably less than or equal to 0.1 mmol, more preferably less than or equal to 0.05 mmol.

As a consequence the heating is preferably stopped when the amount of basic nitrogen is less or equal to 0.2 mmol/g, preferably less than or equal to 0.1 mmol/g, more preferably less than or equal to 0.05 mmol/g as can be e.g. measured by titration with 0.2N hydrochloric acid or any other suitable method known in the art.

According to one preferred embodiment all nitrogen atoms of the product are quaternary.

In one embodiment the molar ratio between the dicarboxylic acid or derivative (Ia) or (Ib) and the alkoxylated fatty amine (II) or (IIa) is 2:1 to 1:2, preferably 1.5:1 to 1:1.5, more preferably 1.4:1 to 1:1.4.

Preferred compounds according to formula (1a) and formula (Ib) are selected from the group consisting of oxalic acid, malonic acid, succinic acid, glutaric acid, glutaconic acid, adipic acid, muconic acid, pimelic acid, phthalic acid, terephthalic acid, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides of these compounds and mixtures thereof, more preferred compounds according to formula (Ia) and formula (Ib) are selected from the group consisting of oxalic acid, malonic acid, succinic acid, glutaric acid, adipic acid, pimelic acid, phthalic acid, tetrahydrophthalic acid, malic acid, tartaric acid, the corresponding acid chlorides, methyl or ethyl esters or anhydrides of these compounds and mixtures thereof, and most preferred is adipic acid;

Preferred compounds according to formula (II) or (IIa) are prepared by alkoxylation of amines selected from the group consisting of 2-ethylhexylamine, 2-propylheptylamine, n-octylamine, n-decylamine, n-dodecylamine, (coco alkyl)-amine, (palm oil alkyl) amine, n-tetradecylamine, n-hexadecylamine, n-octadecylamine, oleylamine, (tallow alkyl)-amine, (hydrogenated tallow alkyl)-amine, (rape seed alkyl)-amine, (soya alkyl)-amine, erucyl amine, N-(n-decyl)-N-methyl-trimethylene-diamine, N-(n-dodecyl)-N-methyl-trimethylene-diamine, N-(coco alkyl)-N-methyl-trimethylene-diamine, N-(rape seed alkyl)-N-methyl-trimethylene-diamine, N-(soya alkyl)-N-methyl-trimethylene-diamine, N-(tallow alkyl)-N-methyl-trimethylene-diamine, N-(hydrogenated tallow alkyl)-N-methyl-trimethylene-diamine, N-(erucyl)-N-methyl-trimethylene-diamine, isotridecyloxypropylamine and mixtures thereof, more preferred are (coco alley)-amine or (tallow alkyl)-amine.

In one embodiment fatty amines as mentioned above are alkoxylated with 2 to 20, preferably 2 to 10 ethoxy units and/or 2 to 20, preferably 2 to 10 propoxy units and/or 2 to 20, preferably 1 to 10 butoxy units to obtain compounds according to formula (II) or (IIa). Randomly alkoxylated products of formula (II) or (IIa) can be obtained by using mixtures of ethoxy units, propoxy units and butoxy units. Blocks can be generated by adding the alkoxy units subsequently, for example first adding ethoxy units then adding propoxy unit and then butoxy units. The alkoxylation may be performed by any suitable method known in the art by using e.g. an alkaline catalyst such as potassium hydroxide, or an acid catalyst.

Examples of commercial products according to formula (II) or (IIa) include Noramox SD20, Noramox SD15, Noramox S11, Noramox S5, Noramox S7, Noramox S2, Noramox SH2, Noramox O2, Noramox O5, Noramox C2, Noramox C5 and Noramox C15 all provided by CECA France. Other examples of commercial products of formula (II) include Tomamine® E-17-5 and Tomamine® E-T-2 available from Air products.

Preferred alkylating agents $R^3X$ are selected from the group consisting of dimethyl sulphate, diethyl sulphate, dimethyl carbonate, benzyl chloride, methyl bromide, methyl chloride, methyl iodide, and mixtures thereof more preferred are dimethyl sulphate or methyl chloride. X is preferably a single- or double-charged anion.

In formula (1) and (1a) x is a number within the range from 1 to 20, preferably within the range from 1 to 10 and more preferably within the range from 1 to 6. The average value of p in formula (1) and (1a) depends on the molar ratios of the compounds according to formula (1a) or (Ib) and (II) or (IIa) and on the reaction conditions. In one embodiment p is a number in the range from 1 to 15, preferably in the range from 1 to 10 and more preferably is in the range from 1 to 5.

According to one embodiment of the present invention the compounds of formula (1) or (1a) may have various radicals and therefore may comprise a mixture of different compounds of formula (1) or (1a).

Furthermore, molecules might be present in the product mixture that are not completely esterified, but the products according to formula (1) or (1a) are the key compounds.

In one embodiment the compound of formula (1) or (1a) is characterized as follows:

$R^1$ represents an alkylene radical having from 1 to 20, preferably from 1 to 10 carbon atoms, more preferably having from 2 to 6 carbon atoms, even more preferably having 4 carbon atoms;

$R^2$ represents a hydrocarbyl group having from 8 to 24 carbon atoms, preferably having from 12 to 24 carbon atoms;

$R^3$ represents a hydrocarbyl group having from 1 to 4 carbon atoms, preferably an alkyl group having 1 or 2 carbon atoms and more preferably is a methyl group;

AO is an alkyleneoxy group, preferably an ethoxy group;

X is an anion derived from an alkylating agent $R^3X$; preferably chloride or sulphate x is a number within the range from 1 to 15, preferably in the range from 2 to 10 and more preferably is in the range from 1 to 6;

p is a number within the range 1 to 15; and t is 0 or 1, preferably 1.

According to still another embodiment the compound of formula (1) or (1a) possesses at least one of the following characteristics:

$R^1$ is derived from a dicarboxylic acid, a dicarboxylic acid chloride, a diester of a dicarboxylic acid, an anhydride of a dicarboxylic acid, preferably $R^1$ is derived from a compound selected from the group consisting of oxalic acid, malonic acid, succinic acid, glutaric acid, glutaconic acid, adipic acid, muconic acid, pimelic acid, phthalic acid, terephthalic acid, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides of these compounds and mixtures thereof, more preferably R' is derived from a compound selected from the group consisting of oxalic acid, malonic acid, succinic acid, glutaric acid, adipic acid, pimelic acid, phthalic acid, tetrahydrophthalic acid, malic acid, tartaric acid, the corresponding acid chlorides, methyl or ethyl esters or anhydrides of these compounds and mixtures thereof, and most preferably adipic acid;

$R^2$ is derived from a fatty amine selected flow the group consisting of 2-ethylhexylamine, 2-propylheptylamine, n-octylamine, n-decylamine, n-dodecylamine, (coco alkyl)-amine, (palm oil alkyl) amine, n-tetradecylamine, n-hexadecylamine, n-octadecylamine, oleylamine, (tallow alkyl)-amine, (hydrogenated tallow alkyl)-amine, (rape seed alkyl)-amine, (soya alkyl)-amine, erucyl amine, N-(n-decyl)-N-methyl-trimethylene-diamine, N-(n-dodecyl)-N-methyl-trimethylene-diamine, N-(coco alkyl)-N-methyl-trimethylene-diamine, N-(rape seed alkyl)-N-methyl-trimethylene-diamine, N-(soya alkyl)-N-methyl-trimethylene-diamine, N-(tallow alkyl)-N-methyl-trimethylene-diamine, N-(hydrogenated tallow alkyl)-N-methyl-trimethylene-diamine, N-(erucyl)-N-methyl-trimethylene-diamine, isotridecyloxypropylamine and mixtures thereof, preferably (coco alky)-amine or (tallow alkyl)-amine;

$R^3$ is derived from an alkylating agent selected from the group consisting of dimethyl sulphate, diethyl sulphate, dimethyl carbonate, benzyl chloride, methyl bromide, methyl chloride, methyl iodide and mixtures thereof, preferably dimethyl sulphate or methyl chloride.

According to still another embodiment the compound of formula (1a) possesses the following characteristics:

$R^1$ is derived from a compound selected from the group consisting of adipic acid, maleic anhydride, sebacic acid and glutaric acid;

$R^2$ is derived from a ethoxylated fatty amine selected from the group consisting of ethoxylated ($C_{16}$-$C_{18}$) and $C_{18}$-unsaturated alkylamine, ethoxylated ($C_8$-$C_{16}$) and $C_{18}$-unsaturated alkylamine, ethoxylated (coco alkyl)-amine, ethoxylated oleylamine, ethoxylated (tallow alkyl)-amine and ethoxylated (palm oil alkyl)-amine; and $R^3$ is derived from an alkylating agent selected from the group consisting of dimethyl sulphate, diethyl sulphate and methyl chloride, and preferably is methyl chloride.

According to a preferred embodiment of the present invention the collector agent of step b) is a polymer of adipic acid with ethoxylated coco alkyl amine (also known as (coco alkyl)-amine) (5OE) which is totally quaternised with methyl chloride. Such a polymer is prepared in the experimental section as CA1. According to another preferred embodiment of the present invention the collector agent of step b) is a polymer of adipic acid with ethoxylated tallow alkyl amine (also known as (tallow alkyl)-amine) (5OE) which is totally quaternised with methyl chloride. Such a polymer is prepared in the experimental section as CA2. According to another preferred embodiment of the present invention the collector agent of step b) is a polymer of adipic acid with ethoxylated tallow alkyl amine (also known as (tallow alkyl)-amine) (11OE) which is totally quaternised with methyl chloride. (OE) is the number of ethylene oxide equivalents that have been reacted with the fatty alkyl amine.

Step C) of the Process of the Invention

Step c) of the process of the invention refers to mixing said white pigment and impurities containing material of step a) and said collector agent of step b), in an aqueous environment to form an aqueous suspension.

According to one embodiment of the present invention the at least one white pigment and impurities containing material of step a) may be mixed, in a first step, with water, and then, the obtained suspension may be mixed with the collector agent of step b) to form an aqueous suspension.

The collector agent of step b) may be mixed, in a first step, with water, and then, the obtained suspension may be mixed with the at least one white pigment and impurities containing material of step a) to form an aqueous suspension.

According to another embodiment of the present invention, the at least one white pigment and impurities containing material of step a) and the collector agent of step b) may be mixed in one step with water to form an aqueous suspension.

Preferably, mixing may be carried out using a wet mill, a mixing tank, a feeding pump or a flotation agitator for mixing the collector into the aqueous suspension.

The mixing may be carried out at room temperature, i.e. at 20° C.±2° C., or at other temperatures. According to one embodiment the mixing may be carried out at a temperature from 5 to 40° C., preferably from 10 to 30° C. and most preferably from 15° C. to 25° C., or at other temperatures. Heat may be introduced by internal shear or by an external source or a combination thereof.

The solids content of the aqueous suspension obtained by the inventive method can be adjusted by the methods known to the skilled person. To adjust the solids content of an aqueous white pigments and impurities containing material comprising suspension, the suspension may be partially or fully dewatered by a filtration, centrifugation or thermal separation process. Alternatively, water may be added to the white pigment and impurities containing material until the desired solids content is obtained. Additionally or alternatively, a suspension having an appropriate lower content of a white pigment and impurities containing material may be added to the aqueous suspension until the desired solid content is obtained.

According to a preferred embodiment, of the present invention the aqueous suspension obtained in step c) has a solids content measured as described in the Examples section hereafter of between 5 and 80 wt.-% based on the total weight of the solids in the suspension, preferably of between 10 and 70 wt.-%, more preferably of between 20 and 60 wt.-% and most preferably of between 25 and 55 wt.-%, based on the total weight of the solids in the suspension.

The aqueous suspension obtained in step c) may have a pH from 7 to 10, preferably from 7.5 to 9.5 and more preferably from 8.5 to 9.0.

The inventive collector agent(s) may be added in step c) in an amount of from 1 to 5,000 ppm, based on the total dry weight of the mineral material of step a), preferably in an amount of from 20 to 2,000 ppm, more preferably in an amount of from 30 to 1,000 ppm, and most preferably in an amount of from 50 to 800 ppm, based on the total dry weight of the mineral material of step a).

The amount of the inventive collector agent may be adjusted by considering the specific surface area of the impurities. According to one embodiment, the inventive collector agent may be added in step c) in an amount of from 1 to 100 mg per m$^2$ of impurities in said white pigment containing material of step a), preferably in an amount of from 5 to 50 mg per m$^2$ of impurities in said white pigment containing material of step a), and most preferably of from 10 to 45 mg per m$^2$ of impurities in said white pigment containing material of step a). The specific surface area of the impurities is measured as described in the Examples section hereafter. Additionally to the white pigment and impurities containing material a) and the collector agent b), one or more further additives may be present in the aqueous suspension. Possible additives are, for example pH-adjusting agents, solvents (water, organic solvent(s) and mixtures thereof); depressants, such as starch, quebracho, tannin, dextrin and guar gum, and polyelectrolytes, such as polyphosphates and water glass, which have a dispersant effect, often combined with a depressant effect. Other conventional additives that are known in the art of flotation are frothers (foaming agents), such as methyl isobutyl carbinol, triethoxy butane, pine oil, terpineol and polypropylene oxide and its alkyl ethers, among which methyl isobutyl carbinol, triethoxy butane, pine oil, terpineol, are preferred frothers. By way of non-limiting examples, preferred conventional additives are generally frothers, among which terpineol is the most commonly used.

Furthermore, one or more other conventional collector agents known in the art of flotation, and preferably one or more conventional cationic collector agents may be in the aqueous suspension formed in step c). Preferred conventional cationic collector agents are those containing no sulphur atoms, and most preferred are those containing only carbon, nitrogen and hydrogen atoms and optionally oxygen atoms. Conventional cationic collector agents, in the form of their addition salts with acids, may however contain sulphur atom(s), when the salifying acid itself comprises sulphur atom(s), e.g. sulphuric, sulphonic or alkane sulphonic acid.

Examples of conventional cationic collector agents that may be present in the suspension obtained from step c) may include, but are not limited to fatty amines and their salts, as well as their alkoxylated derivatives, fatty poly(alkylene amines) and their salts, e.g. polyethylene amines), poly (propylene amines) and their salts, as well as their alkoxylated derivatives, fatty amidopolyamines, and their salts, as well as their alkoxylated derivatives, fatty amidopoly(alkyleneamines), and their salts, as well as their alkoxylated derivatives, fatty imidazolines and their salts, as well as their alkoxylated derivatives, N-fatty alkyl amino carboxylic acid and their salts, e.g. N-fatty alkyl amino propionic acid and their salts, alkyl ether amines and alkyl ether diamines and their salts, quaternary ammonium compounds, e.g. fatty quaternary ammonium compounds, mono(fatty alkyl) quaternary ammonium compounds, di(fatty alkyl) quaternary ammonium compounds, such as those described in WO 2007/122148 Al, and the like.

A "polyamine" in the meaning of the present invention is a compound comprising two or more amine groups, the amine groups possibly being substituted, i.e. the two or more amine groups may be identical or different and be primary, secondary or tertiary amine groups.

Specific examples of conventional cationic collector agents that may be present in the suspension obtained from step c) may include, without any limitation, dicoco-dimethyl ammonium chloride (CAS RN 61789-77-3), coco-dimethylbenzyl ammonium chloride (CAS RN 61789-71-7), tallow dimethylbenzyl ammonium chloride (CAS RN 61789-75-1), ethoxylated tallow monoamine, 1,3-propanediamine-N-tallow diacetate (CAS RN 68911-78-4), N,N',N'-tri-hydroxyethyl N-tallow propylene diamine (CAS RN 61790-85-0), N,N',N'-tri-hydroxyethyl N-oleyl propylene diamine (CAS RN 103625-43-0), N,N',N'-tri-hydroxyethyl N-lauryl propylene diamine (CAS RN 25725-44-4), fatty alkyl imidazoline obtained by condensation of diethylenetriamine and oleic fatty acid (CAS RN 162774-14-3), N,N',N'-tri-hydroxyethyl N-behenyl-propylene diamine (CAS RN 91001-82-0), isodecyloxypropyl-1,3-diaminopropane (CAS RN 72162-46-0), N,N-di(tallow carboxyethyl)-N-hydroxyethyl- N-methyl ammonium methylsulphate (CAS RN 91995-81-2), N-coco-β-aminopropionic acid (CAS RN 84812-94-2), N-lauryl-β-aminopropionic acid (CAS RN 1462-54-0), N-myristyl-β-aminopropionic acid (CAS RN 14960-08-8), their addition salts with acid(s), sodium salt of N-lauryl-β-aminopropionic acid (CAS RN 3546-96-1), triethanolamine salt of N-lauryl-β-aminopropionic acid (CAS RN 14171-00-7), triethanolamine salt of N-myristyl-β-aminopropionic acid (CAS RN 61791-98-8), as well as mixtures of two or more of the above compounds, in all proportions, and the like.

"Etheramines" and "etherdiamines" in the meaning of the present invention are compounds comprising at least one ether group and respectively a $NH_2$ terminal group and a $NH_2$ terminal group as well as another primary, secondary or tertiary amine group.

If there are additives and/or conventional collector agents in the suspension, the collector agent of the present invention may be present from 1 wt.-% to 100 wt-%, more preferably from 10 wt.-% 100 wt.-%, typically from 20 wt.-% to 100 wt %, and advantageously from 1 wt.-% to 99 wt.-%, more preferably from 10 wt.-% to 99 wt.-%, typically from 20 wt-% to 99 wt.-% relative to the total amount of the collector agent and the further additives.

Step D) of the Process of the Invention

Step d) of the process of the invention refers to passing a gas through the suspension formed in step c).

The gas may be generally introduced in the vessel of step d) via one or more entry ports located in the lower half of the vessel. Alternatively or additionally, the gas may be introduced via entry ports located on an agitation device in said vessel. The gas then naturally rises upwards through the suspension.

Preferably the gas in the present invention may be air.

The gas may have a bubble size in the suspension of between 0.01 and 10 mm, preferably of between 0.05 and 5 mm and most preferably between 0.1 and 2 mm.

The gas flow rate in step d) may be adjusted, e.g. between 0.1 and 30 $dm^3$/min, preferably between 1 and 10 $dm^3$/min and more preferably between 3 and 7 $dm^3$/min in a 4 $dm^3$ flotation cell.

According to a preferred embodiment of the invention, step d) may implement an agitation cell and/or a flotation column and/or a pneumatic flotation device and/or a flotation device featuring a gas injection.

According to a preferred embodiment of the present invention, the aqueous suspension in step d) may have a temperature of between 5 and 90° C., preferably between 10 and 70° C., more preferably of between 20 and 50° C. and most preferably between 25 and 40° C.

Step d) may be preferably performed under agitation. Furthermore, step d) may be continuous or discontinuous.

According to a preferred embodiment, step d) is performed until no more foam is formed or can be visually observed or until no more impurities can be collected in the foam.

Step e) of the Process of The Invention

Step e) of the process of the invention refers to recovering the white pigment containing product by removing the white pigment bearing phase from the aqueous suspension obtained after step d).

The inventive process comprises at least one indirect flotation step. In contrast to conventional flotation, in which the desirable white pigments are directly floated and collected from the produced froth, reverse or indirect flotation aims to have the undesirable impurities preferentially floated and removed, leaving behind a suspension that has been concentrated in the desirable white pigments. According to the present invention, the inventive process leads to the formation of a froth containing the impurities and a white pigment bearing phase with the white pigment containing product. The hydrophobised impurities are migrating to the surface of the suspension and are concentrated in a supernatant foam or froth at the surface. This foam can be collected by skimming it off the surface, using for example a scraper, or simply by allowing an overflowing of the foam, and passing the foam into a separate collection container. After collector the foam, the white pigment bearing phase containing the non-floated white pigment containing product will remain. The white pigment containing product remaining in the aqueous suspension can be collected by filtration to remove the aqueous phase, by decantation or by other means commonly employed in the art to separate liquids from solids.

The collected white pigment containing product can be subjected to one or more further steps of froth flotation, according to the invention or according to prior art froth flotation methods.

According to a preferred embodiment, the white pigment bearing phase obtained from step e) may be ground before and/or after step e).

The grinding step can be carried out with any conventional grinding device, for example by e.g. using a ball mill, a hammer mill, a rod mill, a vibrating mill, a roll crusher, a centrifugal impact mill, a vertical bead mill, an attrition mill, a pin mill, a hammer mill. However, any other device that is able to grind the white pigment containing product recovered during method step e) may be used.

Step e) of the inventive process may be followed by at least one grinding or classification step for example by wet grinding and screening to achieve a fine ground product slurry and/or at least one other treatment step.

The hydrophobised impurities obtained by the inventive process and, preferably the hydrophobised silicates that are contained in the foam can be collected as already set out above. In a preferred embodiment of the invention, the hydrophobised impurities may comprise silicates that have a white colour as for example wollastonite, kaolin, kaolinitic clay, calcines kaolinitic clay, montmorillonite, talc, diatomaceous earth or sepiolite. More preferably, the hydrophobised impurity consists of silicates that have a white colour and more preferably the impurity consists of only one white coloured silicate. For example, the impurity may consist only of wollastonite or kaolin or kaolinitic clay or calcined kaolinitic clay or montmorillonite or talc or diatomaceous earth or sepiolite. These impurities obtained and separated from the white pigments according to the inventive flotation method may be further processed and used in suitable applications. The impurities containing only silicates having a white appearance when illuminated by daylight and, preferably containing only one white silicate having a white appearance when illuminated by daylight obtained by the inventive process may be used in the same way than the white pigment containing product, for example in paper, plastics, paint, coatings, concrete, cement, cosmetic, water treatment, food, pharma, ink and/or agriculture applications.

White Pigment Containing Product Obtained by the Process of the Invention

In a preferred embodiment the white pigment containing product obtained by the process of the invention may comprise at least 95 wt.-% white pigments, based on the dry weight, preferably at least 98 wt.-%, more preferably at least 99 wt-% and most preferably at least 99.9 wt.-%, based on the dry weight.

In another embodiment the white pigment containing product obtained by the process of the invention may comprise less than 60 ppm, preferably less than 35 ppm, more preferably less than 15 ppm and most preferably less than 5 ppm of collector agent or degradation products thereof based on the dry weight.

The white pigment containing product as well as the white pigment bearing phase obtained by the inventive process can be used in paper, plastics, paint, coatings, concrete, cement, cosmetic, water treatment, food, pharma, ink and/or agriculture applications. Preferably, the white pigment containing product may be used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The scope and interest of the invention will be better understood based on the following examples which are intended to illustrate certain embodiments of the invention and are non-limitative.

In view of the above, some aspects of the invention relate to:

1. Process for manufacturing white pigment containing products, characterised in that said process comprises the following steps:
    a) providing at least one white pigment and impurities containing material;
    b) providing at least one collector agent selected from the group consisting of compounds of formula (1):

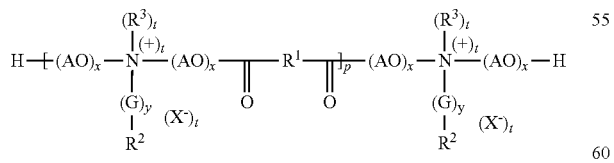

(1)

$R^1$ is selected from the group consisting of a direct bond, an alkylene radical having from 1 to 10 carbon atoms, a substituted alkylene radical, wherein said alkylene radical is substituted by 1 or 2 —OH groups, a cycloalkylene group, a cycloalkenylene group and an arylene group;

$R^2$ is selected from the group consisting of a hydrocarbyl group having from 8 to 24 carbon atoms or a group of formula $R^4$—O-(A'O)$_w$-T-, wherein;
  $R^4$ represents a hydrocarbyl group having from 8 to 24 carbon atoms;
  w is a number within the range from 0 to 20;
  A'O is an alkyleneoxy group having from 2 to 4 carbon atoms; and
  T represents an alkylene group having from 1 to 6 carbon atoms;
$R^3$ is selected from the group consisting of a hydrocarbyl group or a benzyl group;
AO represents an alkyleneoxy group having from 2 to 4 carbon atoms;
X represents an anion derived from an alkylating agent $R^3X$;
x is a number within the range from 1 to 20;
p is a number within the range from 1 to 15;
t is 0 or 1;
y is 0 or 1; and
G represents a group of formula (2);

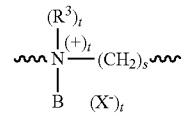

(2)

wherein;
B represents an alkyl group having from 1 to 4 carbon atoms or represents a benzyl group;
s is 1, 2 or 3;
$R^3$, X and t are as defined above;
$N^+$ is connected to $R^2$ in formula (1); and
$(CH_2)_s$ is connected to the quaternary nitrogen atom in formula (1);
    c) mixing said white pigment and impurities containing material of step a) and said collector agent of step b) in an aqueous environment to form an aqueous suspension;
    d) passing gas through the suspension formed in step c);
    e) recovering the white pigment containing product by removing the white pigment bearing phase from the aqueous suspension obtained after step d).
2. Process according to aspect 1, wherein the process involves an indirect flotation step leading to the formation of a froth containing the impurities and a white pigment bearing phase with the white pigment containing product.
3. Process according to any one of the preceding aspects, wherein the white pigment is a white mineral pigment, preferably selected from the group consisting of natural calcium carbonate or ground calcium carbonate, calcium carbonate-comprising mineral material, dolomite, barite, aluminium oxide, titanium dioxide and mixtures of the foregoing.
4. Process according to any one of the preceding aspects, wherein the white mineral pigment is an alkaline earth metal carbonate, preferably a calcium carbonate and most preferably ground calcium carbonate.
5. Process according to any one of the preceding aspects, wherein the white pigment containing material comprises impurities selected from the group consisting of iron sulphides, iron oxides, graphite, silicates and mixtures thereof.

6. Process according to aspect 5, wherein the silicate is selected from the group consisting of quartz, a mica, an amphibolite, a feldspar, a clay mineral and mixtures thereof and preferably is quartz.

7. Process according to aspect 5, wherein the silicate is a white coloured silicate selected from the group consisting of wollastonite, kaolin, kaolinitic clay, calcined kaolinitic clay, montmorillonite, talc, diatomaceous earth, sepiolite and mixtures thereof.

8. Process according to any one of the preceding aspects, wherein the amount of white pigment in the white pigment and impurities containing material of step a) is from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

9. Process according to any one of the preceding aspects, wherein the ratio of white pigment:impurities in the white pigment and impurities containing material of step a) is from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

10. Process according to any one of the preceding aspects, wherein the white pigment and impurities containing material of step a) has a weight median grain diameter in the range of from 1 to 1,000 μm, preferably of from 3 to 700 μm, more preferably of from 5 to 500 μm and most preferably of from 10 to 80 μm or from 100 to 400 μm.

11. Process according to any of the preceding aspects, wherein the compound of formula (1) is characterized as follows:
    $R^1$ represents an alkylene radical having from 2 to 6 carbon atoms, more preferably 4 carbon atoms;
    $R^2$ represents a hydrocarbyl group containing from 12 to 24 carbon atoms or a group of formula $R^4$—O—$(A'O)_w$-T-; wherein
    $R^4$ represents a hydrocarbyl group having from 12 to 24 carbon atoms;
    w is a number ranging from 0 to 10, preferably from 0 to 3;
    A'O represents an alkyleneoxy group having from 2 to 4 carbon atoms; and
    T represents an alkylene group having from 1 to 4 carbon atoms, preferably having from 2 to 3 carbon atoms;
    $R^3$ represents an alkyl group having from 1 to 4 carbon atoms;
    X represents halogen, sulphate or carbonate;
    AO represents an alkyleneoxy group having from 2 to 4 carbon atoms, preferably having 2 carbon atoms;
    x is a number within the range from 1 to 10; more preferably within the range from 1 to 6; and
    p is a number within the range from 1 to 10, preferably within the range from 1 to 5.

12. Process according to any one of the preceding aspects, wherein the compound as provided in step b) is selected from the group consisting of compounds of formula (1a)

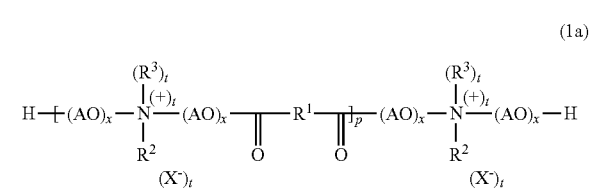

wherein,
AO, p, t, x $R^1$, $R^2$, $R^3$, and X are as defined in claim 1, preferably as defined in aspect 11.

13. Process according to aspect 12, wherein the compound of formula (1a) is characterized as follows:
    $R^1$ represents an alkylene radical having from 1 to 10 carbon atoms, preferably having form 2 to 6 carbon atoms and more preferably having 4 carbon atoms;
    $R^2$ represents a hydrocarbyl group having from 8 to 24 carbon atoms, preferably having from 12 to 24 carbon atoms;
    $R^3$ represents a hydrocarbyl group having from 1 to 4 carbon atoms, preferably an alkyl group having 1 or 2 carbon atoms and more preferably is a methyl group;
    AO is an alkyleneoxy group, preferably an ethoxy group;
    X is an anion derived from an alkylating agent $R^3X$; preferably chloride or sulphate;
    x is a number within the range from 1 to 15, preferably within the range from 2 to 10 and more preferably within the range from 1 to 6;
    p is a number within the range from 1 to 15; and
    t is 0 or 1, preferably 1.

14. Process according to aspect 12 or 13, wherein the compound of formula (1a) possesses at least one of the following characteristics:
    $R^1$ is derived from a dicarboxylic acid, a dicarboxylic acid chloride, a diester of a dicarboxylic acid, an anhydride of a dicarboxylic acid, preferably $R^1$ is derived from a compound selected from the group consisting of oxalic acid, malonic acid, succinic acid, glutaric acid, adipic acid, pimelic acid, phthalic acid, tetrahydrophthalic acid, malic acid, tartaric acid, itaconic acid, the corresponding acid chlorides, methyl or ethyl esters or anhydrides of these compounds and mixtures thereof, preferably adipic acid;
    $R^2$ is derived from a fatty amine selected from the group consisting of 2-ethylhexylamine, 2-propylheptylamine, n-octylamine, n-decylamine, n-dodecylamine, (coco alkyl)-amine, (palm alkyl) amine, n-tetradecylamine, n-hexadecylamine, n-octadecylamine, oleylamine, (tallow alkyl)-amine, (hydrogenated tallow alkyl)-amine, (rape seed alkyl)-amine, (soya alkyl)-amine, erucyl amine, N-(n-decyl)-N-methyl-trimethylene-diamine, N-(n-dodecyl)-N-methyl-trimethylene-diamine, N-(coco alkyl)-N-methyl-trimethylene-diamine, N-(rape seed alkyl)-N-methyl-trimethylene-diamine, N-(soya alkyl)-N-methyl-trimethylene-diamine, N-(tallow alkyl)-N-methyl-trimethylene-diamine, N-(hydrogenated tallow alkyl)-N-methyl-trimethylene-diamine, N-(erucyl)-N-methyl-trimethylene-diamine, isotridecyloxypropylamine and mixtures thereof, preferably (cow alley)-amine or (tallow alkyl)-amine;
    $R^3$ is derived from an alkylating agent selected from the group consisting of dimethyl sulphate, diethyl sulphate, dimethyl carbonate, benzyl chloride, methyl bromide, methyl chloride, methyl iodide, preferably dimethyl sulphate or methyl chloride and mixtures thereof.

15. Process according to any one of the preceding aspects, wherein the collector agent of step b) consists of one or more compounds of formula (1) or (1a).

16. Process according to any one of the preceding aspects, wherein the aqueous suspension obtained in step c) has a pH from 7 to 10, preferably from 7.5 to 9.5 and more preferably from 8.5 to 9.0.

17. Process according to any one of the preceding aspects, wherein the collecting agent is added in step c) in an amount of from 1 to 5,000 ppm based on the total dry weight of the white pigment and impurities containing material of step a), preferably in an amount of from 20 to 2,000 ppm, more preferably in an amount of from 30 to 1,000 ppm, and most preferably in an amount of from 50 to 800 ppm based on the total dry weight of said white pigment and impurities containing material of step a).

18. Process according to any one of the preceding aspects, wherein the aqueous suspension obtained in step c) has a solids content of between 5 and 80 wt.-% based on the total weight of the solids in the suspension, preferably of between 10 and 70 wt.-%, more preferably of between 20 and 60 wt-% and most preferably of between 25 and 55 wt.-% based on the total weight of the solids in the suspension.

19. Process according to any one of the preceding aspects, wherein one or more additives are added to the aqueous suspension prior to, during or after step c), wherein the additives are selected from the group comprising pH-adjusting agents, solvents, depressants, polyelectrolytes, frothers and collector agents other than the collector agents according to formula (1) and/or (1a).

20. Process according to any one of the preceding aspects, wherein the aqueous suspension obtained in step c) is ground during and/or after step c).

21. Process according to any one of the preceding aspects, wherein the gas in step d) is air.

22. Process according to any one of the preceding aspects, wherein the suspension in step has a temperature of between 5 and 40° C., preferably between 10 and 40° C., more preferably between 10 and 30° C. and most preferably between 15 and 25° C.

23. Process according to any one of the preceding aspects, wherein the white pigment bearing phase obtained from step e) is dispersed and/or ground before and/or after step e) and preferably is dispersed and/or ground in the presence of at least one dispersing agent and/or at least one grinding aid agent.

24. Use of the white pigment bearing phase obtainable by the process according to any of the preceding aspects in paper, plastics, paint, coatings, concrete, cement, cosmetic, water treatment, food, pharma, ink and/or agriculture applications, wherein preferably the white pigment containing product is used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

EXAMPLES

1 Measurement Methods pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Particle Size Distribution (Mass % Particles with A Diameter<X) and Weight Median Grain Diameter ($d_{50}$) of Particulate Material The Particle Size Distribution (PSD) and the correlating median grain diameter $d_{50}$ were measured by Laser Diffraction Analyzers; either by Malvern Mastersizer 2000 in case of a $d_{50}$ above 5 μm or by a Micromeritics Sedigraph™ 5120 in case of finer materials (<5 μm). The measurement was carried out in an aqueous solution of 0.1% by weight of $Na_4P_2O_7$ and the samples were dispersed using a high speed stirrer and ultrasonic before. While in the Sedigraph works via the sedimentation method, i.e. an analysis of sedimentation behaviour in a gravimetric field, the Mastersizer runs in a circulation mode.

Weight Solids (wt.-%) of a Material in Suspension

The weight solids were determined by dividing the weight of the solid material by the total weight of the aqueous suspension. The weight of the solid material is determined by weighing the solid material obtained by evaporating the aqueous phase of suspension and drying the obtained material to a constant weight.

Specific Surface (BET) Measurement

The specific surface area (in $m^2/g$) of the white pigment or of the impurities was determined using nitrogen and the BET method, which is well known to the skilled man (ISO 9277:2010). The total surface area (in $m^2$) of the white pigment or of the impurities was then obtained by multiplication of the specific surface area and the mass (in g) of the white pigment or of the impurities. The method and the instrument are known to the skilled person and are commonly used to determine specific surface of white pigments or of the impurities.

Brightness Measurement and Yellow Index (=YI)

The samples from the flotation process were dried by use of microwave. The obtained dry powders were prepared in a powder press to get a flat surface and Tappi brightness (R457 ISO brightness) is measured according to ISO 2469 using an ELREPHO 3000 from the company Datacolor. The results for the Tappi brightness are given as percentage in comparison to a calibration standard.

The yellow index has been calculated by the following formula:

$$YI=100*(R_x-R_z)/R_y$$

Determination of the HCl Insoluble Content 10 g crude material (dry product or slurry under consideration of the solid content) were weighted into a 400 ml beaker, suspended in 50 ml demineralized (demin.) water and mixed with 40 ml HCl (8N=25%). After the formation of carbon dioxide has been finished the mixture was boiled for 5 minutes, cooled to room temperature and subsequently strained over a previously weighed membrane filter. The beaker wall was rinsed 3 times with 20 ml demin. water and afterwards the filter was dried at 105° C. in the microwave until weight constancy is reached. After the filter cooled down in the desiccator it was weighed back and the HCl insoluble (insol.) content was calculated according to following equation:

$$\text{HCl-insol. content[\% by weight]} = \frac{\text{filter gross[g]} - \text{filter tare[g]}}{\text{weighed sample[g](dry mass of slurry)}} \times 100\%$$

Determination of Load Capacity

The surface charge of the collector agent bearing particles in the slurry was measured by a Mütek Particle Charge Detector (PCD04 from BTG) using titration with sodium polyethylenesulphonate (Na-PES) in [μ Val/Kg].

Determination of the Acid Value

The acid value has been measured by potentiometric titration using potassium hydroxide solution as the reagent and isopropyl alcohol as a solvent. In a 250 mL beaker, about 10 g of sample to analyze is precisely weighed (Sw, precision to the mg) and 70 mL of isopropyl alcohol are added. The mixture has been agitated and heated gently if necessary to get a homogeneous sample. The titrator combined glass reference electrode has been introduced into the solution, which has been then agitated with a magnetic stirrer. The acid-base titration of the sample has been performed using 0.1N aqueous potassium hydroxide (KOH) solution and the pH evolution has been recorded on the titrator. The equivalent point has been graphically determined using methods known to the skilled in the art, and the volume ($V_{KOH}$, in mL) of potassium hydroxide solution used to reach this point has been determined. The acid value (AV) has then been obtained according to the following calculation:

$$AV = \frac{\text{[Normality of KOH solution (mol/L)]} \times 56.1 \times V_{KOH}}{Sw}$$

2 Collector Agents

Synthesis of Collector Agent 1 (CA1)

2,025.8 g ethoxylated coco alkyl amine (Noramox C5, supplied by CECA, France, contains 5 moles of ethoxy groups) and 0.2 g of hypophosphorous acid (50%) were introduced in a 4 litres round bottom flask. The mixture was heated to 80° C. with nitrogen bubbling, afterwards the bubbling was stopped and 503.7 g of adipic acid were added under agitation. After 15 minutes the temperature of the mixture was raised to 160° C. during 1 hour and the pressure in the vessel was lowered progressively until a pressure of 6.67 kPa (50 mm Hg) was reached. After one hour at 160° C. and 6.67 kPa the mixture was heated to 200° C. and the mixture was kept at that temperature for 4 hours. Afterwards, the temperature was raised to 220° C. and maintained until almost all acid is consumed (acid value<5 meq/g). The mixture was cooled down to 60° C. and the resulting esteramine (3) was recovered without any further treatment.

2,000 g of esteramine (3) were charged in a 6 litres glass reactor and 300 g iso-propanol were added. Methyl chloride was added until the pressure in the glass reactor reached 2.9 bars, then the temperature was raised to 85° C. and the mixture was kept between 80 to 85° C. until complete reaction has occurred (complete reaction is achieved when the total amount of basic nitrogen is less or equal to 0.2 mmol·g$^{-1}$ as measured by titration with 0.2N hydrochloric acid in iso-propanol). Afterwards the mixture was allowed to cool down to 65° C. and the pressure was reduced to atmospheric pressure. After 2 hours of nitrogen bubbling through the mixture the obtained collector agent 1 (CA1) was recovered and diluted with iso-propanol to reach an iso-propanol-content of 30 wt.-% as determined by proper gas chromatography analysis. The collector agent (CA1) is also known as polymer of adipic acid with ethoxylated coco alkyl amine (also known as (coco alkyl)-amine) (5OE) which is totally quaternised with methyl chloride.

Synthesis of Collector Agent 2 (CA2)

2,201.7 g ethoxylated tallow alkyl amine (Noramox S5, supplied by CECA, France, contains 5 moles of ethoxy groups) and 0.2 g of hypophosphorous acid (50%) were introduced in a 4 litres round bottom flask. The mixture was heated to 80° C. with nitrogen bubbling, afterwards the bubbling was stopped and 503.7 g of adipic acid were added under agitation. After 15 minutes the temperature of the mixture was raised to 160° C. during 1 hour and the pressure in the vessel was lowered progressively until a pressure of 6.67 kPa (50 mm Hg) was reached. After one hour at 160° C. and 6.67 kPa the mixture was heated to 200° C. and the mixture was kept at that temperature for 4 hours. Afterwards, the temperature was raised to 220° C. and maintained until almost all acid is consumed (acid value<5 meq/g). The mixture was cooled down to 60° C. and the resulting esteramine (4) was recovered without any further treatment.

2,038.9 g of esteramine (4) were charged in a 6 litres glass reactor and 305.8 g iso-propanol were added. Methyl chloride was added until the pressure in the glass reactor reaches 2.9 bars, then the temperature was raised to 85° C. and the mixture was kept between 80 to 85° C. until complete reaction has occurred (complete reaction is achieved when the total amount of basic nitrogen is less or equal to 0.2 mmol·g$^{-1}$ as measured by titration with 0.2N hydrochloric acid in iso-propanol). Afterwards the mixture was allowed to cool down to 65° C. and the pressure was reduced to atmospheric pressure. After 2 hours of nitrogen bubbling through the mixture the obtained collector agent 2 (CA2) was recovered and diluted with iso-propanol to reach an iso-propanol-content of 30 wt.-% as determined by proper gas chromatography analysis. The collector agent (CA2) is also known as polymer of adipic acid with ethoxylated tallow alkyl amine (also known as (tallow alkyl)-amine) (5OE) which is totally quaternised with methyl chloride.

Collector Agent 3 (CA3) (Comparative)

Reagent Lupromin FP 18 AS, polymeric esterquat, commercially available from BASF.

Collector Agents 4 to 15 (CA4 to CA15)

The following other collector agents (CA4 to CA15) have been prepared following the same reaction conditions as in example 1 and are obtained by reacting the following compounds:

TABLE 1

Collector agents CA4 to CA15.

| Collector agents | Alkoxylated fatty amine of formula (II) | Dicarboxylic acid or a derivative of formula (Ia) or (Ib) | Molar ratio (II)/(Ia) or (II/Ib) | Alkylating agent R$^3$X for quaternisation reaction |
|---|---|---|---|---|
| CA4 | ethoxylated tallow alkyl amine (2OE) | adipic acid | 1.33 | methyl chloride |
| CA5 | ethoxylated tallow alkyl amine (5OE) | maleic acid | 1.33 | methyl chloride |

TABLE 1-continued

Collector agents CA4 to CA15.

| Collector agents | Alkoxylated fatty amine of formula (II) | Dicarboxylic acid or a derivative of formula (Ia) or (Ib) | Molar ratio (II)/(Ia) or (II/Ib) | Alkylating agent $R^3X$ for quaternisation reaction |
|---|---|---|---|---|
| CA6 | ethoxylated tallow alkyl amine (5OE) | sebacic acid | 1.33 | methyl chloride |
| CA7 | ethoxylated oleylamine (5OE) | adipic acid | 1.33 | methyl chloride |
| CA8 | ethoxylated palm oil alkyl amine (5OE) | adipic acid | 1.33 | methyl chloride |
| CA9 | ethoxylated coco alkyl amine (2OE) | adipic acid | 1.33 | methyl chloride |
| CA10 | ethoxylated coco alkyl amine (5OE) | succinic anhydride | 1.33 | methyl chloride |
| CA11 | ethoxylated tallow alkyl amine (2OE) | adipic acid | 1.5 | methyl chloride |
| CA12 | ethoxylated tallow alkyl amine (5OE) | adipic acid | 1.5 | methyl chloride |
| CA13 | ethoxylated tallow alkyl amine (5OE) | adipic acid | 1.33 | dimethyl sulphate |
| CA14 | ethoxylated tallow alkyl amine (5OE) | adipic acid | 1.33 | diethyl sulphate |
| CA15 | ethoxylated tallow alkyl amine (5OE) | glutaric acid | 1.33 | methyl chloride |

In Table 1 the alkoxylated fatty amine of formula (II) are described by the origin of the fatty alkyl chain. The number of ethylene oxide (OE) equivalents that have been reacted with the fatty alkyl amine are given in brackets. All collector agents CA4 to CA15 are totally quaternised.

The collector agent CA4 to CA15 also shown good properties in the process for manufacturing white pigment containing products according to the present invention.

3 Flotation Trials

All froth flotation trials were performed at room temperature (20±2° C.) in an Outotec laboratory flotation cell, equipped with a conical gassing agitator under agitation of 1,600 rpm under use of a 4 dm³ capacity glass cell. The solids content of the aqueous white pigment and impurities containing material suspension added to the flotation machine was of 33% by dry weight, said white pigment and impurities containing material being sourced from sedimentary marble rock deposits with different origins, running already a flotation process. The used water was original tab water from each local flotation process.

80%, a typical practiced dosage, of the flotation agent were given in the beginning of the trial and mixed within a 2 min conditioning time. A second dosage was added depending on the achieved froth product and visual seen impurities in the cell.

A flotation gas, consisting of air, was then introduced via orifices situated along the axis of the agitator at a rate of approximately 2 dm³/min.

The foam created at the surface of the suspension was separated from the suspension by overflow and skimming until no more foam could be collected, and both the remaining suspension and the collected foam were dewatered and dried in order to form two concentrates for mass balance and quality analyses like carbon fraction determination.

Comparative Examples are marked with a "C" after the Example number.

Examples 1 to 3

For Examples 1 to 3 a white pigment and impurities containing material from Gummern marble deposit in Austria is selected. The material contains 3.21 wt.-% of impurities determined by carbon fraction determination. The material is crushed and pre ground to a median grinding size $d_{50}$ of 20 μm. The material is treated according to the above mentioned process. The test data are summarized in the following Table 2.

TABLE 2

Flotation trials.

| | Flotation data | | | White pigment comprising product | | |
|---|---|---|---|---|---|---|
| Test No. | Collector agent | Amount of Collector agent [ppm] | Flotation time [minutes] | Impurities [wt.-%][a] | Tappi-brightness | Yellow-index |
| 1 | CA1 | 300 | 15 | 0.79 | 91.18 | 2.44 |
| 2 | CA1 | 400 | 20 | 0.05 | 93.40 | 2.43 |
| 3 | CA1 | 500 | 25 | 0.05 | 94.06 | 2.23 |
| 4 | CA2 | 300 | 15 | 0.77 | 90.89 | 2.05 |
| 5 | CA2 | 400 | 20 | 0.06 | 93.06 | 2.52 |
| 6 | CA2 | 500 | 25 | 0.05 | 93.73 | 2.39 |
| 7C | CA3 | 400 | 20 | 0.95 | 90.70 | 1.94 |
| 8C | CA3 | 500 | 20 | 0.08 | 93.58 | 2.22 |
| 9C | CA3 | 600 | 25 | 0.06 | 93.90 | 2.09 |

[a] Impurities expressed as compounds insoluble in 8N HCl.

As can be gathered from Examples 1 to 6 the inventive process for manufacturing white pigment comprising products shows good results (low amount of impurities in the white pigment containing product, high values for Tappi-brightness and low values for yellow-indices) even at low amounts of collector agent (test no. 2 or 3: 400 ppm) within the aqueous suspension. A process according to Comparative Examples 7C to 9C uses collector agents according to the prior art and yields a product comprising a higher amount of impurities. The comparison of the products purified with the same amount of collector agents (test no. 2, 5 and 7C) shows that the products obtained by a process using collector agents according to the invention have a lower amount of impurities.

4 Stability Tests

To investigate the stability of the reagent, it was stirred in parallel at 20° C. and at 40° C. for 24 h and the reduction of the positive Mytek charge was controlled for defined time periods by using Na-PES as anionic titration agent. The resulting products were used afterwards for lab flotation tests in comparison to the original ones. The flotation tests were done at natural pH of 8.5 to 9.

TABLE 3

Stability tests.

| Collector agent | Temperature [° C.] | Time [h:min] | Load capacity [μVal/kg] |
|---|---|---|---|
| CA1 (inventive) | 20 | 0 | 13 622 |
| CA1 (inventive) | 20 | 1:41 | 12 771 |

TABLE 3-continued

Stability tests.

| Collector agent | Temperature [° C.] | Time [h:min] | Load capacity [µVal/kg] |
|---|---|---|---|
| CA1 (inventive) | 20 | 5:01 | 10 866 |
| CA1 (inventive) | 20 | 23:30 | 10 755 |
| CA1 (inventive) | 40 | 0 | 13 622 |
| CA1 (inventive) | 40 | 1:12 | 13 361 |
| CA1 (inventive) | 40 | 5:29 | 11 037 |
| CA1 (inventive) | 40 | 22:55 | 9 799 |
| CA3 (comparative) | 20 | 0 | 12 051 |
| CA3 (comparative) | 20 | 1:38 | 11 075 |
| CA3 (comparative) | 20 | 4:58 | 90 53 |
| CA3 (comparative) | 20 | 23:30 | 61 63 |
| CA3 (comparative) | 40 | 0 | 12 051 |
| CA3 (comparative) | 40 | 1:12 | 8 805 |
| CA3 (comparative) | 40 | 5:29 | 6 320 |
| CA3 (comparative) | 40 | 22:52 | 5 101 |

The load capacity of the collector agent according to the invention reduces by 21% at 20° C. and by 28% at 40° C. after approximately 24 h, whereas the collector agent according to the prior shows a reduction of the load capacity by 49% at 20° C. and 58% at 40° C. The results confirm that the collector agents according to the invention show a higher stability in comparison to prior art collector agents.

Flotation trials according to the conditions as given in section 3 have been carried out with the original collector agents (test no. 10 and 12C) and with collector agents which have been stored for 24 h at 40° C. as a 1 wt.-% aqueous solution (test no. 11 and 13C).

TABLE 4

Flotation trials.

| | Flotation data | | | White pigment comprising product Impurities [wt.-%]$^{a)}$ |
|---|---|---|---|---|
| Test No. | Collector agent | Amount of Collector agent [ppm] | Flotation time [minutes] | |
| 10 | CA1 | 500 | 25 | 0.05 |
| 11 | CA1 | 500 | 25 | 0.07 |
| 12C | CA3 | 600 | 30 | 0.06 |
| 13C | CA3 | 600 | 30 | 1.49 |

$^{a)}$Impurities expressed as compounds insoluble in 8N HCl.

The results shown in Table 4 above confirm that the performance of the collector agents according to the invention after and before storage is higher than the performance of the prior art collector agents. Even after 24 h storage the performance of the collector agents according to the invention is higher than the performance of the original prior art collector agents (comparison of test no. 11 with test no. 12C).

The invention claimed is:

1. A process for manufacturing white pigment containing products, the process comprising the following steps:

a) providing at least one white pigment and impurities containing material;

b) providing at least one collector agent is selected from the group consisting of compounds of formula (1):

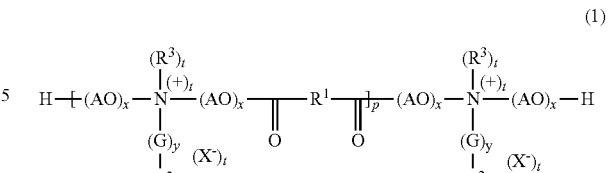

wherein $R^1$ is selected from the group consisting of
i. a direct bond,
ii. a $C_1$-$C_{20}$, linear or branched, saturated or unsaturated hydrocarbon chain optionally substituted by one or more —OH group(s), one or more methyl and/or methylene groups, a cycloalkylene group, a cycloalkenylene group and/or an arylene group;

$R^2$ is selected from the group consisting of a hydrocarbyl group having from 8 to 24 carbon atoms or a group of formula $R^4$—O-(A'O)w-T- wherein,
$R^4$ represents a hydrocarbyl group having from 8 to 24 carbon atoms;
w is a number within the range from 0 to 20;
A'O is an alkyleneoxy group having from 2 to 4 carbon atoms; and
T represents an alkylene group having from 1 to 6 carbon atoms;

$R^3$ is selected from the group consisting of a hydrocarbyl group or a benzyl group;

AO represents an alkyleneoxy group having from 2 to 4 carbon atoms;

X represents an anion derived from an alkylating agent $R^3X$;

x is a number within the range from 1 to 20;
p is a number within the range from 1 to 15;
t is 0 or 1;
y is 0 or 1; and
G represents a group of formula (2);

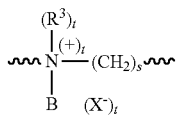

wherein,
B represents an alkyl group having from 1 to 4 carbon atoms or represents a benzyl group;
s is 1, 2 or 3;
$R^3$, X and t are as defined above;
$N^+$ in formula (2) is connected to $R^2$ in formula (1); and
$(CH_2)_s$ is connected to the quaternary nitrogen atom in formula (1);

c) mixing the at least one white pigment and impurities containing material of step a) and the at least one collector agent of step b) in an aqueous environment to form an aqueous suspension;

d) passing gas through the suspension formed in step c) to separate the white pigment from the impurities; and e) recovering the white pigment containing product by removing the white pigment from the aqueous suspension obtained after step d).

2. The process according to claim 1, wherein the process comprises performing an indirect flotation step that forms a froth containing the impurities and a white pigment bearing phase with the white pigment containing product.

3. The process according to claim 1, wherein the white pigment is a white mineral pigment.

4. The process according to claim 1, wherein the white mineral pigment is an alkaline earth metal carbonate.

5. The process according to claim 1, wherein the white pigment containing material comprises impurities selected from the group consisting of iron sulphides, iron oxides, graphite, silicates and mixtures thereof.

6. The process according to claim 5, wherein the silicate is selected from the group consisting of a quartz, a mica, an amphibolite, a feldspar, a clay mineral and mixtures thereof.

7. The process according to claim 5, wherein the silicate is a white colored silicate selected from the group consisting of wollastonite, kaolin, kaolinitic clay, calcined kaolinitic clay, montmorillonite, talc, diatomaceous earth, sepiolite and mixtures thereof.

8. The process according to claim 1, wherein the amount of white pigment in the white pigment and impurities containing material of step a) is from 0.1 to 99.9 wt.-%, based on the dry weight.

9. The process according to claim 1, wherein the ratio of white pigment:impurities in the white pigment and impurities containing material of step a) is from 0.1:99.9 to 99.9:0.1, based on the dry weight.

10. The process according to claim 1, wherein the white pigment and impurities containing material of step a) has a weight median grain diameter in the range of from 1 μm to 1,000 μm.

11. The process according to claim 1, wherein in the compound of formula (1):
$R^1$ represents an alkylene radical having from 2 to 6 carbon atoms;
$R^2$ represents a hydrocarbyl group containing from 12 to 24 carbon atoms or a group of formula $R^4$—O-(A'O)$_w$-T- wherein,
$R^4$ represents a hydrocarbyl group having from 12 to 24 carbon atoms;
w is a number ranging from 0 to 10;
A'O represents an alkyleneoxy group having from 2 to 4 carbon atoms; and
T represents an alkylene group having from 1 to 4 carbon atoms;
$R^3$ represents an alkyl group having from 1 to 4 carbon atoms;
X represents halogen, sulphate or carbonate;
AO represents an alkyleneoxy group having from 2 to 4 carbon atoms;
x is a number within the range from 1 to 10; and
p is a number within the range from 1 to 10.

12. The process according to claim 1, wherein the compound as provided in step b) is selected from the group consisting of compounds of formula (1a)

(1a)

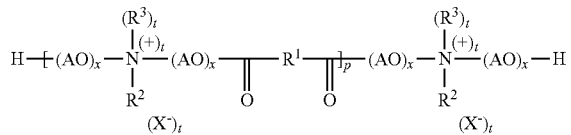

wherein AO, p, t, x, $R^1$, $R^2$, $R^3$, and X are as defined in claim 1.

13. The process according to claim 12, wherein in the compound of formula (1a):
$R^1$ represents an alkylene radical having from 1 to 20;
$R^2$ represents a hydrocarbyl group having from 8 to 24 carbon atoms;
$R^3$ represents a hydrocarbyl group having from 1 to 4 carbon atoms;
AO is an alkyleneoxy group having from 2 to 4 carbon atoms;
X is an anion derived from an alkylating agent $R^3X$;
x is a number within the range from 1 to 15;
p is a number within the range from 1 to 15; and
t is 0 or 1.

14. The process according to claim 12, wherein in the compound of formula (1a):
$R^1$ is derived from a dicarboxylic acid, a dicarboxylic acid chloride, a diester of a dicarboxylic acid, an anhydride of a dicarboxylic acid; and/or
$R^2$ is derived from a fatty amine selected from the group consisting of 2-ethylhexylamine, 2-propylheptylamine, n-octylamine, n-decylamine, n-dodecylamine, (coco alkyl)-amine, (palm oil alkyl) amine, n-tetradecylamine, n-hexadecylamine, n-octadecylamine, oleylamine, (tallow alkyl)-amine, (hydrogenated tallow alkyl)-amine, (rape seed alkyl)-amine, (soya alkyl)-amine, erucyl amine, N-(n-decyl)-N-methyl-trimethylene-diamine, N-(n-dodecyl)-N-methyl-trimethylene-diamine, N-(coco alkyl)-N-methyl-trimethylene-diamine, N-(rape seed alkyl)-N-methyl-trimethylene-diamine, N-(soya alkyl)-N-methyl-trimethylene-diamine, N-(tallow alkyl)-N-methyl-trimethylene-diamine, N-(hydrogenated tallow alkyl)-N-methyl-trimethylene-diamine, N-(erucyl)-N-methyl-trimethylene-diamine, isotridecyloxypropylamine and mixtures thereof; and/or
$R^3$ is derived from an alkylating agent selected from the group consisting of dimethyl sulphate, diethyl sulphate, dimethyl carbonate, benzyl chloride, methyl bromide, methyl chloride, methyl iodide, and mixtures thereof.

15. The process according to claim 12, wherein in the compound of formula (1a):
$R^1$ is derived from a compound selected from the group consisting of adipic acid, maleic anhydride, sebacic acid and glutaric acid;
$R^2$ is derived from a ethoxylated fatty amine selected from the group consisting of ethoxylated ($C_{16}$-$C_{18}$) and $C_{18}$-unsaturated alkylamine, ethoxylated ($C_8$-$C_{16}$) and $C_{18}$-unsaturated alkylamine, ethoxylated (coco alkyl)-amine, ethoxylated oleylamine, ethoxylated (tallow alkyl)-amine and ethoxylated (palm oil alkyl)-amine; and
$R^3$ is derived from an alkylating agent selected from the group consisting of dimethyl sulphate, diethyl sulphate and methyl chloride.

16. The process according to claim 1, wherein, the at least one collector agent of step b) consists of one or more compounds of formula (1).

17. The process according to claim 1, wherein the aqueous suspension obtained in step c) has a pH from 7 to 10.

18. The process according to claim 1, wherein the at least one collecting agent is added in step c) in an amount of from 1 ppm to 5,000 ppm based on the total dry weight of the white pigment and impurities containing material of step a).

19. The process according to claim 1, wherein the aqueous suspension obtained in step c) has a solids content of from 5 wt.-% to 80 wt.-% based on the total weight of the solids in the suspension.

20. The process according to claim 1, wherein one or more additives are added to the aqueous suspension prior to, during or after step c), wherein the additives are selected from the group comprising pH-adjusting agents, solvents, depressants, polyelectrolytes, frothers and collector agents other than the collector agents according to formula (1).

21. The process according to claim 1, wherein the aqueous suspension obtained in step c) is ground during and/or after step c).

22. The process according to claim 1, wherein the gas in step d) is air.

23. The process according to claim 1, wherein the suspension in step c) has a temperature of from 5° C. and 40° C.

24. The process according to claim 2, wherein the white pigment bearing phase obtained from step e) is dispersed and/or ground before and/or after step e).

25. The process according to claim 1, wherein when $R^1$ is a $C_1$-$C_{20}$ hydrocarbon, it is selected from the group consisting of
a) an alkylene radical having from 1 to 20 carbon atoms, and
b) an alkenylene radical having from 1 to 20 carbon atoms.

26. The process according to claim 25, wherein when $R^1$ is the alkylene radical, it has from 1 to 10 carbon atoms.

27. The process according to claim 25, wherein when $R^1$ is the alkylene radical, it is a substituted alkylene radical.

28. The process according to claim 27, wherein the substituted alkylene radical is substituted by 1 or 2 —OH groups, 1 or 2 methyl and/or methylene groups, a cycloalkylene group, a cycloalkenylene group and/or an arylene group.

29. The process according to claim 25, wherein when $R^1$ is the alkenylene, the alkenylene has from 1 to 10 carbon atoms.

30. The process according to claim 25, wherein when $R^1$ the alkenylene radical, it is a substituted alkenylene.

31. The process according to claim 30, wherein the substituted alkenylene radical is substituted by 1 or 2 —OH groups, 1 or 2 methyl and/or methylene groups, a cycloalkylene group, a cycloalkenylene group and/or an arylene group.

32. The process according to claim 3, wherein the white mineral pigment is selected from the group consisting of natural calcium carbonate or ground calcium carbonate, calcium carbonate-comprising mineral material, dolomite, barite, aluminum oxide, titanium dioxide and mixtures of the foregoing.

33. The process according to claim 4, wherein the earth metal carbonate is a calcium carbonate.

34. The process according to claim 33, wherein the calcium carbonate is ground calcium carbonate.

35. The process according to claim 6, wherein the silicate is a quartz.

36. The process according to claim 8, wherein the amount of the white pigment in the amount of the white pigment and impurities containing material is from 30 to 99.7 wt.-% based on dry weight.

37. The process according to claim 8, wherein the amount of the amount of the white pigment in the white pigment and impurities containing material is from 60 to 99.3 wt.-% based on dry weight.

38. The process according to claim 8, wherein the amount of the amount of the white pigment in the white pigment and impurities containing material is from 80 to 99 wt.-% based on dry weight.

39. The process according to claim 9, wherein the ratio of white pigment:impurities in the white pigment and impurities containing material of step a) is from 30:70 to 99.7:0.3 based on dry weight.

40. The process according to claim 9, wherein the ratio of white pigment:impurities in the white pigment and impurities containing material of step a) is from 60:40 to 99.3:0.7 based on dry weight.

41. The process according to claim 9, wherein the ratio of white pigment:impurities in the white pigment and impurities containing material of step a) is from 80:20 to 99:1 based on dry weight.

42. The process according to claim 10, wherein the weight median grain diameter is from 3 μm to 700 μm.

43. The process according to claim 10, wherein the weight median grain diameter is from 5 μm to 500 μm.

44. The process according to claim 10, wherein the weight median grain diameter is from 10 μm to 80 μm.

45. The process according to claim 10, wherein the weight median grain diameter is 100 μm to 400 μm.

46. The process according to claim 11, wherein $R^1$ is an alkylene radical having 4 carbon atoms.

47. The process of claim 11, wherein w in $R^4$ is a number from 0 to 3.

48. The process according to claim 11, wherein T is an alkylene having from 2 to 3 carbon atoms.

49. The process according to claim 11, wherein AO is an alkyleneoxy having 2 carbon atoms.

50. The process according to claim 11, wherein x is a number within the range from 1 to 6.

51. The process according to claim 11, wherein p is a number within the range from 1 to 5.

52. The process according to claim 13, wherein $R^1$ is an alkylene radical having from 1 to 10 carbon atoms.

53. The process according to claim 13, wherein $R^1$ is an alkylene radical, having form 2 to 6 carbon atoms.

54. The process according to claim 13, wherein $R^1$ is an alkylene radical having 4 carbon atoms.

55. The process according to claim 13, wherein $R^2$ is a hydrocarbyl group having from 12 to 24 carbon atoms.

56. The process according to claim 13, wherein $R^3$ is an alkyl group having 1 or 2 carbon atoms.

57. The process according to claim 13, wherein $R^3$ is a methyl group.

58. The process according to claim 13, wherein AO is an ethoxy group.

59. The process according to claim 13, wherein X is chloride or sulphate.

60. The process according to claim 13, wherein x is a number within the range from 2 to 10.

61. The process according to claim 13, wherein x is a number within the range from 1 to 6.

62. The process according to claim 13, wherein t is 1.

63. The process according to claim 14, wherein $R^1$ is derived from a compound selected from the group consisting of oxalic acid, malonic acid, succinic acid, glutaric acid, glutaconic acid, adipic acid, muconic acid, pimelic acid, phthalic acid, terephthalic acid, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides of these compounds and mixtures thereof.

64. The process according to claim 14, wherein $R^1$ is derived from a compound selected from the group consisting of oxalic acid, malonic acid, succinic acid, glutaric acid, adipic acid, pimelic acid, phthalic acid, tetrahydrophthalic acid, malic acid, tartaric acid, the corresponding acid chlorides, methyl or ethyl esters or anhydrides of these compounds and mixtures thereof.

65. The process according to claim 14, wherein $R^1$ is derived from adipic acid.

66. The process according to claim 14, wherein $R^2$ is derived from a compound selected from the group consisting of (coco alky)-amine, (tallow alkyl)-amine and mixtures thereof.

67. The process according to claim 14, wherein $R^3$ is derived from a compound selected from the group consisting of dimethyl sulphate, methyl chloride.

68. The process according to claim 17, wherein the pH is from 7.5 to 9.5.

69. The process according to claim 17, wherein the pH is from 8.5 to 9.0.

70. The process according to claim 18, wherein the at least one collecting agent is added in step c) in an amount of from 20 ppm to 2,000 ppm.

71. The process according to claim 18, wherein the at least one collecting agent is added in step c) in an amount of from 30 ppm to 1,000 ppm.

72. The process according to claim 18, wherein the at least one collecting agent is added in step c) in an amount of from 50 ppm to 800 ppm.

73. The process according to claim 19, wherein the solids content is from 10 wt.-% to 70 wt.-% based on the total weight of the solids in the suspension.

74. The process according to claim 24, wherein the white pigment bearing phase is dispersed and/or ground in the presence of at least one dispersing agent and/or at least one grinding aid agent.

75. The process according to claim 14, wherein $R^3$ is methyl chloride.

76. The process according to claim 12, wherein, the at least one collector agent of step b) consists of one or more compounds of formula (1a).

77. The process according to claim 12, wherein one or more additives are added to the aqueous suspension prior to, during or after step c), wherein the additives are selected from the group comprising pH-adjusting agents, solvents, depressants, polyelectrolytes, frothers and collector agents other than the collector agents according to formula (1a).

* * * * *